US009998509B2

(12) United States Patent
Kotler et al.

(10) Patent No.: US 9,998,509 B2
(45) Date of Patent: Jun. 12, 2018

(54) APPLICATION OF COMMENTS IN MULTIPLE APPLICATION FUNCTIONALITY CONTENT

(71) Applicant: Microsoft Technology Licensing, LLC, Redmond, WA (US)

(72) Inventors: Matthew J. Kotler, Sammamish, WA (US); Ned B. Friend, Seattle, WA (US); Erez Kikin-Gil, Redmond, WA (US); Charles W. Parker, Sammamish, WA (US); Igor Zaika, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 184 days.

(21) Appl. No.: 14/754,425

(22) Filed: Jun. 29, 2015

(65) Prior Publication Data

US 2015/0304374 A1 Oct. 22, 2015

Related U.S. Application Data

(63) Continuation of application No. 13/272,363, filed on Oct. 13, 2011, now Pat. No. 9,069,743.

(51) Int. Cl.
*G06F 17/00* (2006.01)
*H04L 29/06* (2006.01)
(Continued)

(52) U.S. Cl.
CPC .......... *H04L 65/403* (2013.01); *G06F 3/0482* (2013.01); *G06F 3/04842* (2013.01); *G06F 17/241* (2013.01); *G06F 17/30716* (2013.01)

(58) Field of Classification Search
CPC ............................ G06F 17/246; G06F 17/241
See application file for complete search history.

(56) References Cited

U.S. PATENT DOCUMENTS 5,181,162 A 1/1993 Smith et al.
5,537,618 A * 7/1996 Boulton ................ G09B 5/065 434/118

(Continued)

OTHER PUBLICATIONS

Notice of Allowance dated Jun. 17, 2015, in co-pending U.S. Appl. No. 13/272,740.

(Continued)

*Primary Examiner* — Laurie A Ries
(74) *Attorney, Agent, or Firm* — Merchant & Gould P.C.

(57) ABSTRACT

Application of comments to a variety of application functionality content is provided. Comments may be entered and displayed in a comments user interface component directly in line in the text or other objects of a document or other content item. Displayed comments may be collapsed to a simplified comments tab that may remain displayed in the associated document or content item. Selection of the comments tab may allow for expansion of the comments user interface component to full size. The comments tab may likewise be collapsed to an icon or other image displayed next to the associated content, and the icon or other image may be configured to provide an indication of the length of an associated comments conversation thread. One or more social feedback mechanisms may be employed to show feedback on a given component or portion of a document or content item.

20 Claims, 16 Drawing Sheets

(51) Int. Cl.

*G06F 17/30* (2006.01)
*G06F 17/24* (2006.01)
*G06F 3/0482* (2013.01)
*G06F 3/0484* (2013.01)

(56) References Cited

U.S. PATENT DOCUMENTS 5,669,005 A 9/1997 Curbow et al.
6,012,087 A 1/2000 Freivald et al.
6,560,620 B1 5/2003 Ching
6,803,930 B1 10/2004 Simonson
6,820,111 B1 11/2004 Rubin et al.
6,907,569 B1 6/2005 Craft
7,284,208 B2 10/2007 Matthews
7,337,392 B2 2/2008 Lue
7,548,915 B2* 6/2009 Ramer .............. G06F 17/30867 705/14.54
7,555,557 B2* 6/2009 Bradley ............... G11B 27/034 709/205
7,801,885 B1* 9/2010 Verma ............... G06F 17/30867 707/713
7,885,902 B1* 2/2011 Shoemaker ............ G06Q 10/10 705/1.1
8,086,960 B1* 12/2011 Gopalakrishna .. G06F 17/30896 715/234
8,176,515 B2 5/2012 Ahmad et al.
8,239,497 B2* 8/2012 Kazerouni ................ G06F 3/14 455/556.2
8,296,654 B2* 10/2012 Ahlberg ................ G06F 9/4443 715/704
8,321,463 B2* 11/2012 Cierniak ........... G06F 17/30867 707/706
8,531,571 B1 9/2013 Côté
8,667,519 B2* 3/2014 Small ................. H04N 21/4223 725/10
8,930,843 B2* 1/2015 Mangini ................. G06F 3/048 709/231
9,069,743 B2 6/2015 Kotler et al.
9,176,933 B2 11/2015 Kotler et al.
9,189,500 B2 11/2015 Stallings et al.
2002/0120494 A1* 8/2002 Altemuehle ..... G06Q 10/06395 705/345
2003/0135538 A1 7/2003 Takeuchi et al.
2003/0164849 A1* 9/2003 Barrie .................... G06Q 50/00 715/733
2003/0229611 A1 12/2003 Hintenach
2004/0049417 A1* 3/2004 Nickerson .............. G06Q 30/02 705/7.32
2004/0085354 A1* 5/2004 Massand ............. G06F 17/2229 715/751
2004/0172272 A1* 9/2004 Shillinglaw ...... G06Q 10/06375 705/7.37
2004/0233235 A1 11/2004 Rubin et al.
2005/0086188 A1 4/2005 Hillis et al.
2005/0192854 A1* 9/2005 Ebert ....................... G09B 7/02 709/224
2005/0255914 A1* 11/2005 McHale .................. A63F 13/10 463/31
2006/0041556 A1 2/2006 Taniguchi et al.
2006/0053365 A1 3/2006 Hollander et al.
2006/0236254 A1 10/2006 Mateescu
2006/0282762 A1 12/2006 Diamond et al.
2007/0027830 A1* 2/2007 Simons ............... G06F 17/3089
2007/0143122 A1* 6/2007 Holloway .......... G06Q 30/0282 705/347
2007/0198935 A1 8/2007 Constantine et al.
2007/0260996 A1* 11/2007 Jakobson ............ G06F 17/2288 715/781
2007/0277093 A1 11/2007 Joshi et al.
2008/0270406 A1* 10/2008 Flavin ............... G06F 17/30722
2009/0144654 A1 6/2009 Brouwer et al.
2009/0177997 A1 7/2009 Do et al.
2009/0199082 A1 8/2009 Hollander et al.
2009/0210828 A1 8/2009 Kahn
2009/0217150 A1 8/2009 Lin
2009/0235187 A1 9/2009 Kim et al.
2010/0031162 A1 2/2010 Wiser et al.
2010/0169262 A1* 7/2010 Kenedy ................. H04W 12/08 706/50
2010/0218127 A1 8/2010 Wurzer
2010/0228693 A1 9/2010 Dawson et al.
2010/0235297 A1* 9/2010 Mamorsky ............. G06Q 40/06 705/36 R
2011/0010665 A1* 1/2011 DeLuca ............... G06Q 10/107 715/810
2011/0021250 A1* 1/2011 Ickman ............. G06F 17/30867 455/566
2011/0054968 A1* 3/2011 Galaviz .................. G06Q 10/06 705/7.28
2011/0206023 A1 8/2011 Cohn et al.
2011/0306028 A1* 12/2011 Galimore ................. G09B 7/00 434/322
2012/0023534 A1* 1/2012 Dasilva ............... G06F 17/3082 725/109
2012/0151346 A1* 6/2012 McClements, IV . G06Q 10/101 715/716
2012/0198361 A1* 8/2012 Ganimasty ........ G06F 17/30899 715/760
2012/0254770 A1* 10/2012 Ophir .................... G06F 3/0481 715/752
2012/0290950 A1* 11/2012 Rapaport ................ H04L 51/32 715/753
2012/0320083 A1* 12/2012 Zhu ..................... G06F 19/3406 345/619
2013/0091419 A1* 4/2013 Caliman ............... G06F 17/241 715/236
2013/0097481 A1 4/2013 Kotler et al.
2013/0097490 A1 4/2013 Kotler et al.
2013/0132886 A1* 5/2013 Mangini ................. G06F 3/048 715/781
2014/0032481 A1* 1/2014 Lang ................. G06F 17/30011 707/607
2014/0033015 A1* 1/2014 Shaver .................. G06F 17/241 715/233
2014/0033068 A1* 1/2014 Gupta .................. G06Q 10/103 715/751
2015/0199411 A1 7/2015 Greenspan et al.
2016/0054898 A1 2/2016 Kotler et al.
2017/0169120 A1* 6/2017 Neff .................. G06F 17/30867

OTHER PUBLICATIONS

Office Action dated Dec. 5, 2012, in co-pending U.S. Appl. No. 13/272,363.

Office Action dated May 1, 2013, in co-pending U.S. Appl. No. 13/272,363.

Office Action dated Jan. 13, 2014, in co-pending U.S. Appl. No. 13/272,363.

Office Action dated Aug. 25, 2014, in co-pending U.S. Appl. No. 13/272,363.

Notice of Allowance dated Feb. 24, 2015, in co-pending U.S. Appl. No. 13/272,363.

Robert Cannon, et al. Enhancing Document with Annotations and Machine-Readable Structured Information Using Notate. Published Mar. 4, 2007. http://www.textensor.com/enhancing-documents-2007.html. pp. 20.

Dmitri Popov. Co-ment: Document Collaboration and Annotation Tool. Published Apr. 2, 2010. http://www.linux-magazine.com/Onlin/Blogs/Productivity-Sauce-Dmitri-s-open-source-blend-of-productive-computing/co-ment-Document-Collaboration-and-Annotation-Tool. pp. 2.

Marja-Riitta Koivunen, et al. Collaboration Through Annotations in the Semantic Web. Published May 7, 2006. http://annotea.org/2003/annotationbook/annotea.htm. pp. 10.

Guillaum Cabanac, et al. A Social Validation of collaborative Annotations on Digital Documents. Published Nov. 24-25, 2005. ftp://ftp.irit.fr/IRIT/SIG/2005_IWAC_CCCJ.pdf. pp. 10.

(56) References Cited

OTHER PUBLICATIONS

Aditya Kalyanpur, et al. A Threaded Interface for Collaborative Annotation of PDF Documents. Published Jul. 15, 2007. http://www.mindswap.org/~aditkal/pdforum.pdf. pp. 9.
Collaborative Computing. Retrieved on Jul. 19, 2010. http://www.google.co.uk/url?sa=t&source=web&cd=1&ved=0CBUQFjAA&url=http%3A%2F%2Fwww.adaptivesoftware.biz%2Farchive%2Fdocuments%2FCollaborative%2520Computing.doc&ei=kjFFTP-pLpSi0gSfieGpDw&usg=AFQjCNH9FSa1msKfKXKtLpbxZBBOsfo5BQ. pp. 5.
Michael F. Ruffini. Using E-Maps to Organize and Navigate Online Content. Published Jan.-Mar. 2008. http://www.educause.edu/EDUCAUSE+Quarterly/EDUCAUSEQuarterlyMagazineVolum/UsingEMapstoOrganizeandNavigat/162517. pp. 2.
Airaj Fatimah. Collaborating on Documents with Multiple Users in Google Docs. Published Apr. 14, 2010. http://www.brighthub.com/internet/google/articles/8236.aspx. pp. 2.
Guide to MLA Parenthetical Documentation. Published Jan. 2007. http://www.ithaca.edu/library/research/mla_parenthetical.pdf. pp. 7.
Module 14: Splitter Windows and Multiple Views. Retrieved on Jul. 20, 2010. http://www.tenouk.com/download/pdf/visualcplusmfc14.pdf. pp. 55.
Non-Linear PowerPoint Presentations. Retrieved on Jul. 20, 2010. http://www.guidesandtutorials.com/non-linear-powerpoint-overview.html. pp. 3.
Office Action dated May 23, 2013, in co-pending U.S. Appl. No. 13/272,740.
Office Action dated Dec. 27, 2013, in co-pending U.S. Appl. No. 13/272,740.
Office Action dated Aug. 7, 2014, in co-pending U.S. Appl. No. 13/272,740.
Office Action dated Jan. 21, 2015, in co-pending U.S. Appl. No. 13/272,740.
U.S. Appl. No. 14/930,370, Office Action dated Dec. 12, 2017, 13 pages.
U.S. Appl. No. 14/930,370, Office Action dated Apr. 10, 2018, 17 pages.

* cited by examiner

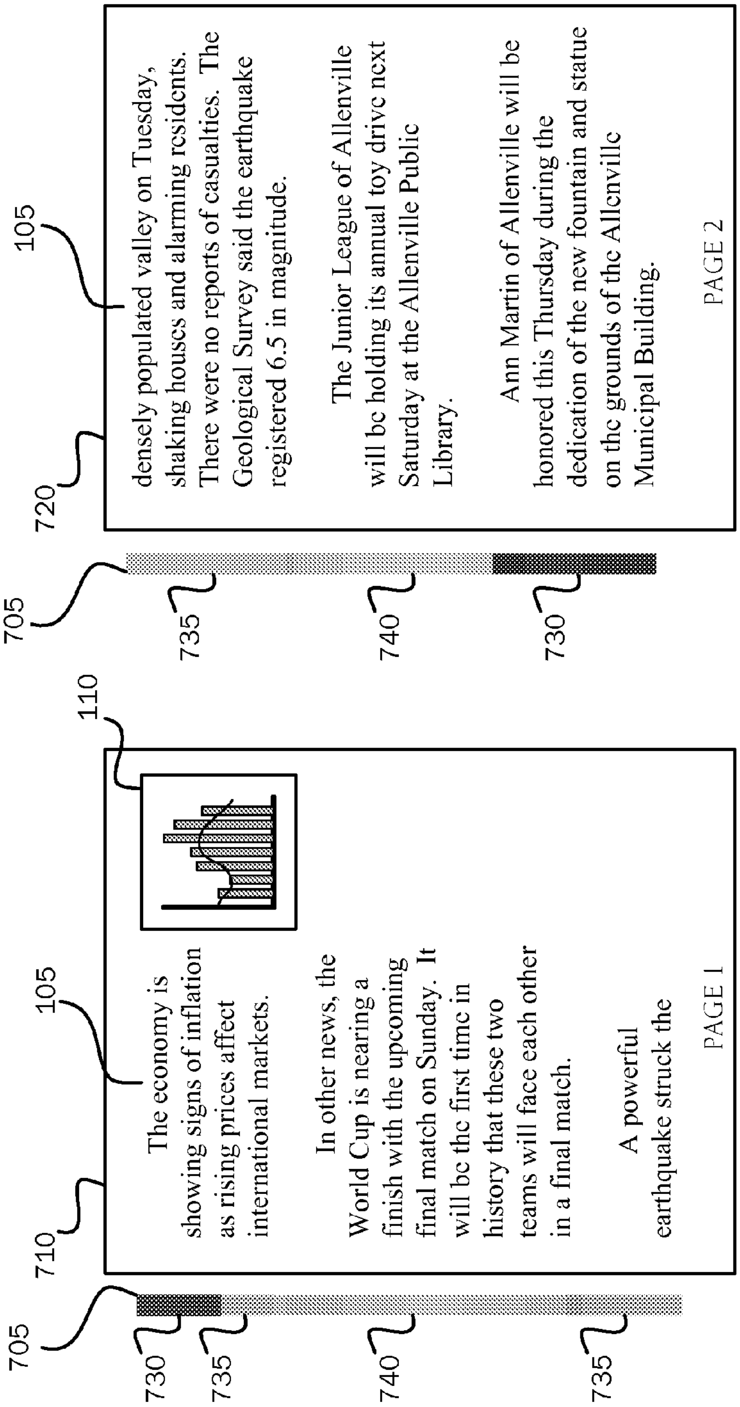

FIG. 7

Page 2 (105, 720):
densely populated valley on Tuesday, shaking houses and alarming residents. There were no reports of casualties. The Geological Survey said the earthquake registered 6.5 in magnitude.

The Junior League of Allenville will be holding its annual toy drive next Saturday at the Allenville Public Library.

Ann Martin of Allenville will be honored this Thursday during the dedication of the new fountain and statue on the grounds of the Allenville Municipal Building.

PAGE 2

Page 1 (105, 110, 710):
The economy is showing signs of inflation as rising prices affect international markets.

In other news, the World Cup is nearing a finish with the upcoming final match on Sunday. It will be the first time in history that these two teams will face each other in a final match.

A powerful earthquake struck the

PAGE 1

APPLICATION OF COMMENTS IN MULTIPLE APPLICATION FUNCTIONALITY CONTENT

RELATED APPLICATIONS

This application is a continuation of U.S. patent application Ser. No. 13/272,363, filed Oct. 13, 2011, assigned U.S. Pat. No. 9,069,743, and is related to U.S. patent application Ser. No. 13/272,740, titled "APPLICATION OF MULTIPLE CONTENT ITEMS AND FUNCTIONALITY TO AN ELECTRONIC CONTENT ITEM", filed Oct. 13, 2011, which are incorporated herein by reference.

BACKGROUND

Since the advent of computers and computer systems, a variety of software applications have been developed to allow users to generate a multitude of content and content types. Users may generate word processing documents, spreadsheet documents, slide presentation documents, notes documents, electronic mail documents (and email threads), and the like. Systems have been developed to allow users to insert comments into content items as content items are reviewed to assist in a process of revising or otherwise improving the content items. In a typical case, inserted comments are appended to the end of a content item (e.g., end of a document), or comments are exposed in a "bubble" or "pop-up" user interface component display to a side or at a bottom of the content item. In addition, where a second user provides a follow-up comment to a preceding or previous comment, the follow-up comment typically is displayed in a second user interface component and may not be readily associated with the previous or preceding comment. Such comments may be helpful, but utilization of such comments in a content item review or revision process can be cumbersome and often do not lead to efficient content review, revision and management.

In some cases, users resort to crude methods of commenting by using different text color or other markup (e.g., boldface or italics) to indicate a comment-like remark or statement in-line in a document. For example, in an electronic mail (email) thread, users often apply color, boldface, italics and the like to text inserted in a an email thread to create the look of an in-line comment for conveying a remark or other information to other users/reviewers of the email thread.

It is with respect to these and other considerations that the present invention has been made.

SUMMARY

Embodiments of the present invention solve the above and other problems by providing application of comments to a variety of application functionality content. According to embodiments, comments may be entered and displayed in a comments user interface component directly in line in the text or other objects of a document or other content item. A comment conversation thread may be generated and likewise may be displayed in line in a document or other content item in an easy-to-read, full text size configuration that allows for efficient review of comments and for provision of responsive comments associated with one or more components or portions of a given document or content item. According to one embodiment, the document/comments display configuration may be "flipped" or pivoted such that the comments are the primary display feature and the associated document text or other objects become a secondary display feature.

According to embodiments, displayed comments may be collapsed to a simplified comments tab that may remain displayed in the associated document or content item. Selection of the comments tab may allow for expansion of the comments user interface component to full size. The comments tab may likewise be collapsed to an icon or other image displayed next to the associated content, and the icon or other image may be configured to provide an indication of the length of an associated comments conversation thread. An indication of one or more comments applied to a given document may also be displayed in a scroll bar deployed in proximity to a displayed document.

According to other embodiments, one or more social feedback mechanisms may be employed to show feedback on a given component or portion of a document or content item. For example, according to one social feedback mechanism, a visual image may be displayed next to a component or portion of a document or content item, such as a "thumbs up" or "thumbs down" image, to allow a reviewing user to express approval or disapproval with a given component or portion of a document or content item. For another example, according to another social feedback mechanism, a heat map display meter may be displayed next to a component or portion of a document or content item to provide a visual indication of how various reviewers approve or disapprove of an associated component or portion of a document or content item.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

FIG. 7 is a simplified block diagram showing a computer-generated display of two pages of an example document and showing social feedback heat map meters in association with the displayed document content pages.

DETAILED DESCRIPTION

Figure 1:
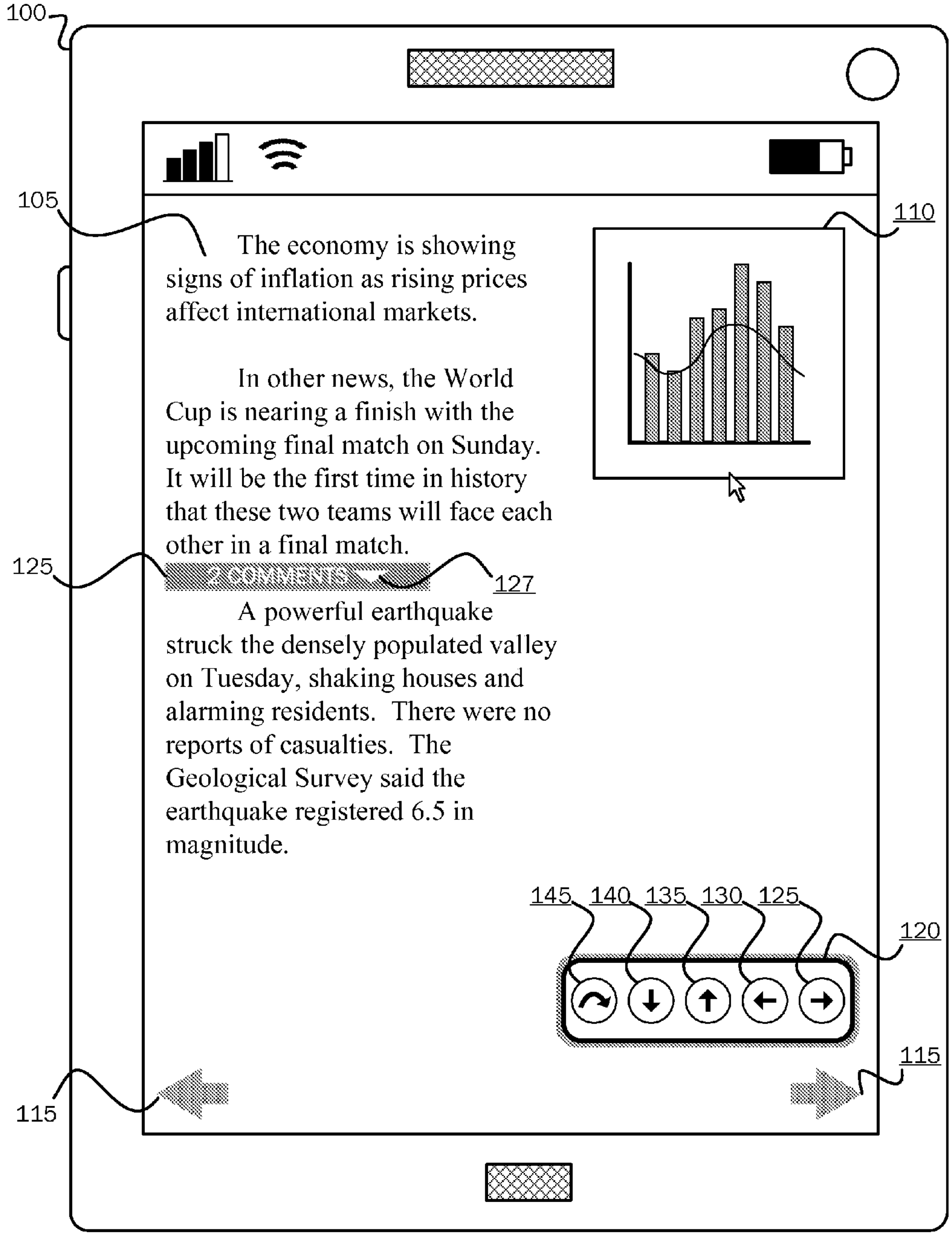
FIG. 1 is a simplified block diagram illustrating a computer-generated display on which are displayed document content and an associated collapsed comments tab.

As briefly described above, embodiments of the present invention are directed to application of computer-enabled comments in a multi-application functionality document or other content item. Comments applied to a computer-generated document or other content item, for example, a word processing application document, a spreadsheet application document, a slide presentation application document, a notes application document, and the like may be entered into a comments user interface component in line, between lines, between paragraphs, between images, or in association with other objects contained in a given document or content item.

Responsive comments entered in response to a previous or preceding comment may be entered directly into the user interface component beneath a previous or preceding comment, and the comments user interface component may be displayed in full size (i.e., same or similar margins as the associated document or other content item and same or similar text font and/or size) for allowing the comments to be read in an efficient and comfortable manner in association with the components or portions of the associated document or content item to which the comments are directed. For example, a list of comments may be threaded together, as described below with reference to FIG. 2A, and a user may interact with the entire comments conversation thread as a whole, or the user may interact with individual comment items in the conversation.

If desired, a comments user interface component may be collapsed to a comments tab that may remain displayed in the associated document or content item in a position in the document or content item at which text, images, or other objects being comment on are positioned. In addition, the comments tab may be collapsed to a selectable icon or image that may be disposed along a side of an associated document component or portion to indicate the presence and nature of comments that may be displayed in association with the content component or portion. In addition, one or more social feedback mechanisms may be employed to allow reviewing users to provide feedback expressing approval or disapproval of a given component or portion of a document or other content item.

The following detailed description refers to the accompanying drawings. Wherever possible, the same reference numbers are used in the drawing and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

FIG. 1 is a simplified block diagram illustrating a computer-generated display on which are displayed document content and an associated collapsed comments tab. The computer-generated content item 105, 110 is illustrated in a display screen of an example computing device 100. According to embodiments, the computing device 100 may be in the form of a variety of acceptable computing devices, for example, a general purpose computing device, personal computer, a laptop computer, a tablet computer, a slate-type computer, a mobile computer, a hand-held telephonic computer (e.g., mobile telephone or smart phone), and the like.

According to embodiments, content 105, 110 may be entered, edited, or otherwise interacted with according to a variety of input means. Suitable input means include, but are not limited to, keyboard/mouse entry/interaction, touch screen interaction, for example, where a user writes, draws, or otherwise interacts with software application functionality through touching the display screen of the computing device 100, electronic pen/stylus interaction, voice command, wherein for example, a user issues commands to software application functionality or issues voice-based content entry, gesture commands, photographic input, wherein for example, photographs may be taken and entered into a document or comment, and the like. According to an embodiment, for purposes of receiving voice-based and gesture-based input, the device 100 may be coupled a microphone operative to capture voice commands, and the device 100 may be coupled a camera operative to record and capture motions and/or gestures made by a user. Such a camera may be operative to provide motion detection capable of detecting movement from users for interpreting the movements as commands for causing changes in application functionality. For example, a camera may comprise a Microsoft® Kinect® motion capture device comprising a plurality of cameras and a plurality of microphones for capturing both motion and voice or other audio information.

The document 105 illustrated on the display screen of the computing device 100 is illustrative of a variety of electronic computer-generated or computer-enabled content items, for example, text-based word processing documents, spreadsheet documents, slide presentation slides, Internet-based web pages, and the like, enabled according to a variety of suitable software applications, for example, word processing applications, spreadsheet applications, slide presentation applications, Internet-based web browsing applications, and the like. Similarly, the chart 110 illustrated in the document 105 may be generated by and displayed according to one or more software applications suitable for generating and displaying charts or other images.

According to embodiments, as will be described below, a comments application 920, illustrated below with respect to FIGS. 9, 10B and 11, may be utilized in association with the computing device 100 for allowing input and display of comments associated with one or more portions or components of a given content item 105, 110. According to embodiments, the comments application 920 is a software application operative to provide the comments interfaces and indicators and feedback mechanisms described herein in association with a variety of content item types (as described above). The comments application may be a component software application module of another software application, for example, a word processing application document, a spreadsheet application document, a slide presentation application document, a notes application document, an Internet-based web page document, and the like. Alternatively, the comments application 920 may be a standalone software application that may be called by such other software applications via one or more application programming interfaces for obtaining from the comments application 920 the comments and feedback functionality described herein.

According to another alternative embodiment, the comments application 920 may be operated as a service (e.g., a cloud-based service) where the functionality of the comments application 920 is operated remotely from any given computing device. In such an operation, client-side comments applications 920 may communicate with the remotely operated comments application 920 for comments functionality, including storage of comments and retrieval of previously stored comments. For example, in a collaborative working environment, a first user may comment on a document from her slate or tablet-style computer, and her comments may be reflected in real time to another user reviewing the same document from his laptop computer and to yet another user reviewing the same document from her desktop computer. In such a case the comments application 920 operating on the remote server may act as a service point for coordinating central comments application and collection and for corresponding the comments to various remote users. Thus a multi-device synchronization of comments application and review is enabled. For another example, all comments ever made by an individual user in association with a document or group of documents may be retrieved for review, ratings or other feedback provided by other users about a given user or about his/her comments may be retrieved for review, application of one or more comments to remotely stored documents may be accomplished, and the like. Operation of a service-oriented or distributed computing environment is described in more detail below with reference to FIG. 11.

Referring still to FIG. 1, a comments tab 125 is displayed underneath a portion of text contained in the document 105 to indicate the presence of a prescribed number of comments entered in association with the text or other content component or portion to which the comments tab is associated. For example, the comments tab 125 may be displayed underneath a portion of text, as illustrated in FIG. 1, or the comments tab 125 may be displayed underneath a displayed object, for example, a chart 110, a table, an image, a photograph, or any other computer-enabled component or portion of a document or other content item for which one or more users may wish to provide comments.

Referring to the comments tab 125, information concerning the nature of the comments associated with the comments tab 125 may be displayed in the comments tab 125. For example, if a single comment is associated with the comments tab 125 a label such as "comments" or "one comment" may be included in the comments tab 125. On the other hand, if multiple comments are associated with the displayed comments tab 125, then a number followed by the label "comments" may be displayed as illustrated in FIG. 1. For example, in FIG. 1 the label "two comments" is displayed in the comments tab 125 to alert users that two comments may be reviewed by expanding the comments user interface component, as illustrated and describe below with reference to FIG. 2. A chevron 127 may be provided in the comments tab 125 to indicate that the comments user interface component may be expanded underneath the comments tab 125 for exposing the comments associated with the comments tab 125, as described below with reference to FIG. 2.

According to embodiments, additional information may be provided in the comments tab 125. For example, an identification of the person commenting may be provided in the comments tab 125. If more than one comment is available having more than one comment author, a scrolling feature may be provided in the tab 125 to allow a user to scroll through information provided in the tab without actually opening the underlying comments, as described below with reference to FIG. 2A. Other information that may be provided in the comments tab may include priority of comments (e.g., high, medium, and low), whether comments have been read/unread, resolved/unresolved, and the like.

As should be appreciated, the display of the comments tab 125 along the left side of the document 105, as illustrated in FIG. 1, is for purposes of illustration only and is not limiting of other display orientations that may be utilized for the comments tab 125. For example, comments associated with the chart 110 may be provided, and the comments tab 125 may be displayed underneath the chart 110 if desired. Similarly, one comments tab 125 may be displayed underneath a portion of text, as illustrated in FIG. 1, and a second comments tab may be displayed under another object, for example, the chart 110 to indicate that comments have been entered with respect to the chart 110.

Figure 2A:
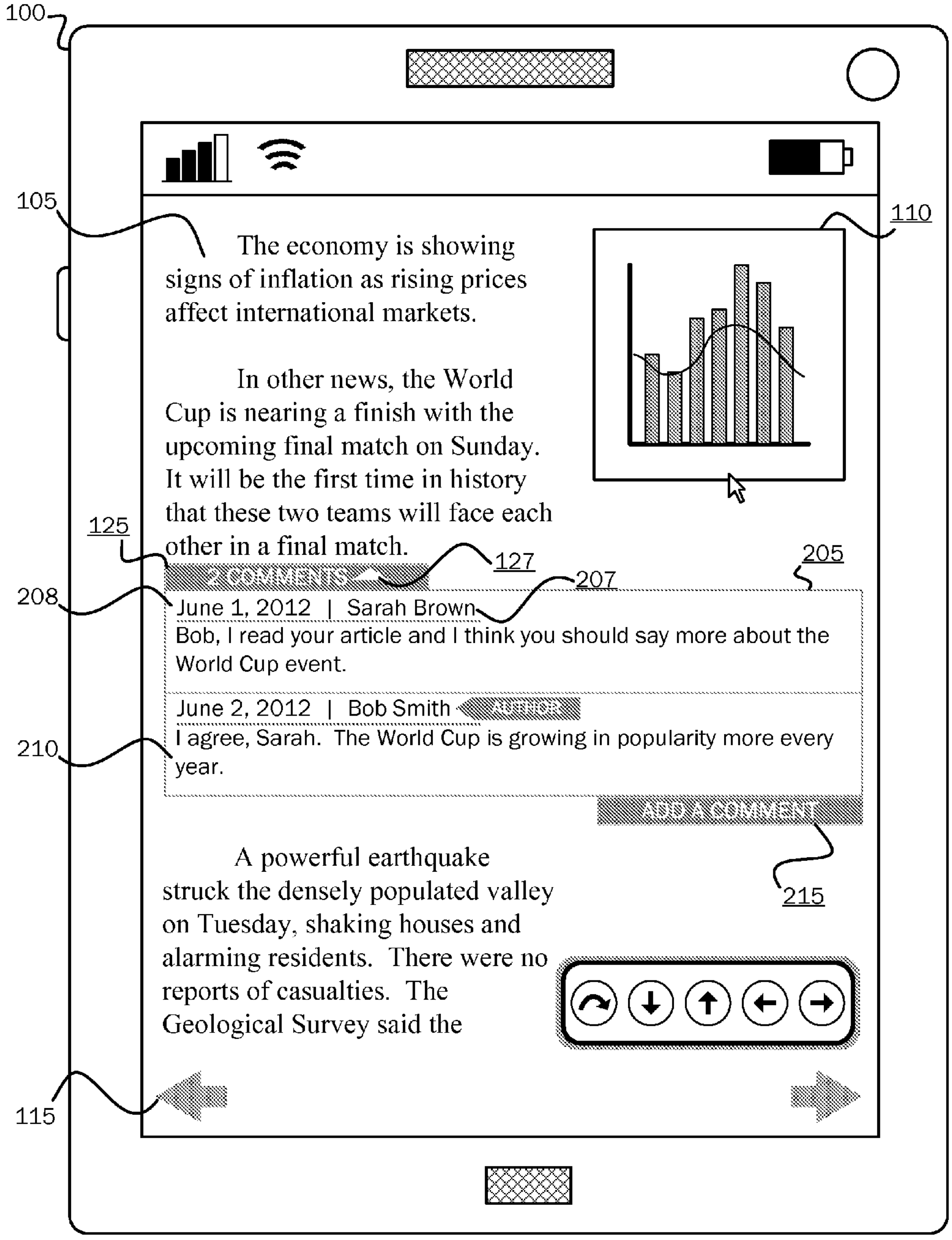
FIG. 2A is a simplified block diagram illustrating a computer-generated display on which is displayed document content and showing an expanded comments interface for showing one or more comments associated with the displayed document content.

Referring now to FIG. 2A, upon selection of the comments tab 125, a comments user interface 205 may be automatically expanded in line in the associated document or other content item 105. As illustrated in FIG. 2A, the comments user interface expanded underneath the comments tab 125 includes two example comments 208, 210 that comprise a comments conversation thread associated with an example text portion of the document 105. As should be appreciated, in addition to entering one or more text-based comments into the comments user interface component 205, other content, for example, images, spreadsheet application charts, slide presentation application slides, photographs, links, music files, and the like may be inserted into the comments user interface component 205 for review by other users or comment providers in association with the document or content item to which comments are directed. As should be appreciated, content may be entered and edited in the comments user interface 205 via all the input means described above for entry and editing of content items 105, 110.

Referring to the example comments 208, 210, a first comment is received from a reviewer 207 of the document 105 in which the reviewer provides a comment to the author of the document 105 as to suggested changes or revisions to the document 105. The author may select the "Add a comment" button 215 to add the responsive comment 210, and the author and reviewer may thus engage in a comment conversation directly in line, between lines, between paragraphs, between images, between objects, or in association with other content items to make the review and editing process more efficient. Additional comments functionality may be provided in a comments editing user interface component, as described below with reference to FIG. 2D.

Such a comment process is particularly helpful where the document 105 may be accessed by multiple users and/or reviewers as part of a collaborative workspace where the document 105 may be displayed on computing device display screens of multiple users who may engage in a live comments conversation in line with the document, as illustrated in FIG. 2A. As should be appreciated, if a third comment provider would like to add a comment for the comment conversation, the third comment provider may select the "Add a comment" button 215 for adding yet another comment on the associated text item or other object, or for adding a responsive comment to one of the comments 208, 210 already provided. Indeed, a comments conversation thread may run through the entire document where a number of comments are threaded together owing to their commentary and responsive commentary in association with a given aspect of the document. As should be appreciated, multiple comments threads may exist in a given document where one thread is associated with one aspect of a document, another thread is associated with a second aspect of the document, and so on.

As illustrated in FIG. 2A, the expanded comment user interface component 205 is illustrated as a full size user interface component where the user interface component may be displayed in a size that is similar to content in which it is displayed in an "in line" manner where the comments user interface flows with the other content contained in the document or other content item. That is, the comments user interface 205 may be displayed in a display configuration and display size such that the displayed comments user interface and such that comments received and displayed in the comments user interface match a display configuration and display size of the displayed first content item. Thus, the comments displayed in the comments user interface component 205 may be easily entered, edited, submitted, displayed, or responded to. As should be appreciated, if desired, a text style or font associated with comments entered in and displayed in the comments user interface component 205 may be utilized to distinguish comments from the text of an associated document or other content item. For example, the text font of comments may be changed from a text font of the associated document or other content item to a different text font to allow a comment provider to easily distinguish comments from the associated text or other content items. As should be appreciated, the comments user interface component 205 and the example comments 208, 210, illustrated in FIG. 2A, are shown in relation to a text-based document, for example, a word processing document. According to embodiments, the comments user interface component and associated functionality may similarly be applied to other types of content, for example, slide presentation application slides, spreadsheet documents, and the like.

According to embodiments, the document content and associated comments described herein may be entered, edited and reviewed across multiple computing devices, such as a general purpose computing device, a personal computer, a laptop computer, a tablet computer, a slate-type computer, a mobile computer, a hand-held telephonic computer (e.g., mobile telephone or smart phone), and the like. Document content and comments accessible by such devices may be interacted with across such devices. For example, a document 105 may be stored at a remote server as part of a collaborative workspace. Various members of the collaborative workspace may comment on the document, and all members of the workspace may access the document and comments from their respective computing devices.

Figure 2B:
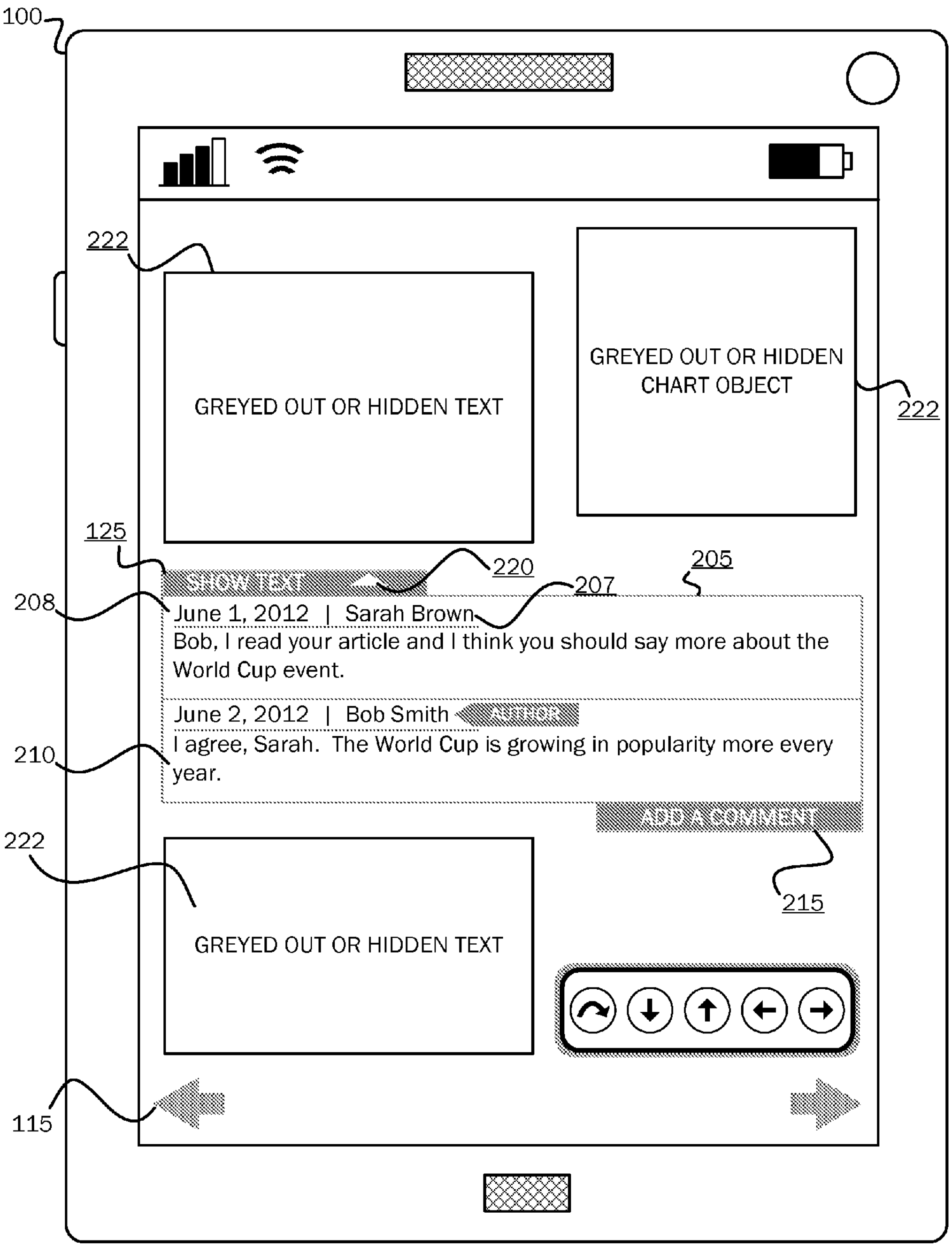
FIG. 2B is a simplified block diagram illustrating a computer-generated display on which is displayed document content and showing an expanded comments interface for showing one or more comments associated with the displayed document content.

Referring now to FIG. 2B, according to another embodiment, the document/comments display configuration may be "flipped" or pivoted such that the comments are the primary display feature and the associated document text or other objects become a secondary display feature. According to one embodiment, a display formatting for the text or other objects may be changed to remove or alter the view of the text or other objects such that they become secondary to the display of the comments. As illustrated in FIG. 2B, the text or other objects 222 of a given document may be removed from view or "greyed out" such that the primary display in the document becomes the comments. In addition, such text or other objects may be collapsed from view altogether or into a selectable control or icon, which when selected, may cause the collapsed text or objects to be replaced back into view. Thus, the only content displayed to a reviewing user may be one or more running comments conversation threads. A "show text" button 220 is provided for flipping or pivoting the display orientation back to a view showing the text and other objects, as illustrated in FIG. 2A. According to this embodiment, a user may consider the comments running through a document to be of particular interest and would like to review the comments as a document of their own before returning to a review of the document text and other objects. As should be appreciated a variety of comments-only views may be generated, for example, a comments only view showing comments from one set of reviewers, a comments-only view showing comments from a second set of reviewers, and the like.

Figure 2C:
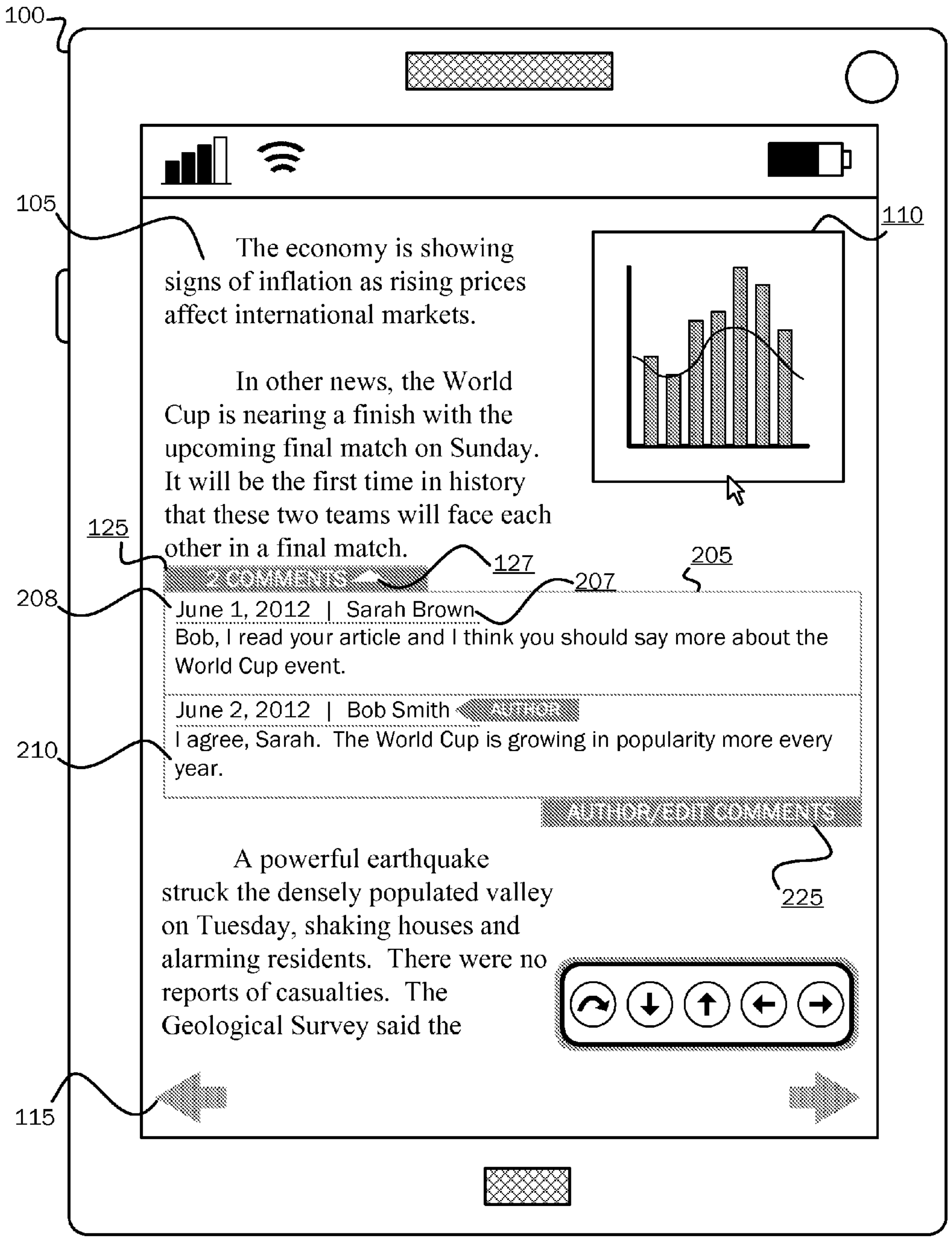
FIG. 2C is a simplified block diagram illustrating a computer-generated display on which is displayed document content and showing an expanded comments interface for showing one or more comments associated with the displayed document content.
Figure 2D:
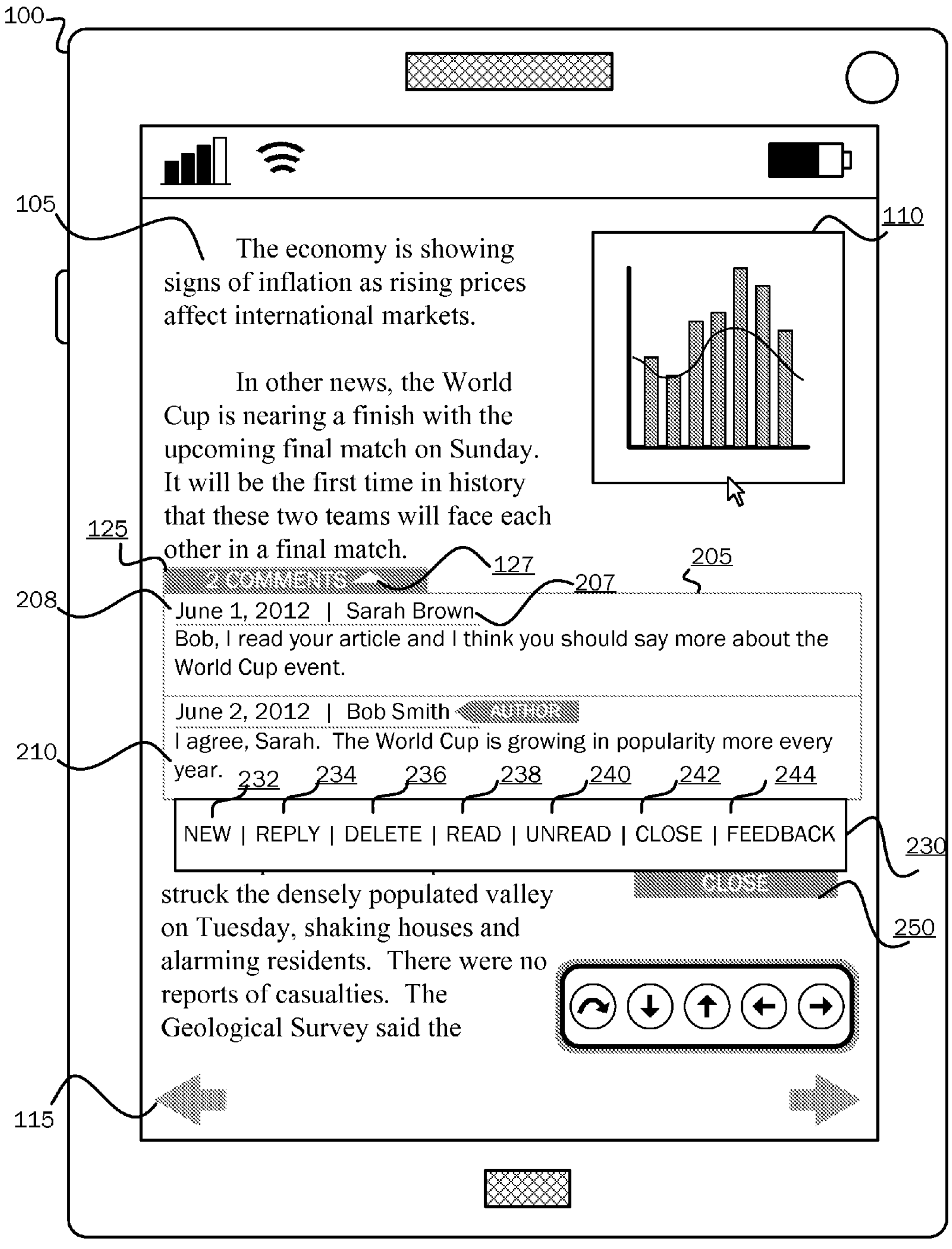
FIG. 2D is a simplified block diagram illustrating a computer-generated display on which is displayed document content and showing an expanded comments interface for showing one or more comments associated with the displayed document content and showing a user interface component for interacting with one or more comments.

FIGS. 2C and 2D illustrate example user interface components for providing one or more functionalities of the comments application 920 for creating, editing, deleting and otherwise interacting with one or more comments. As illustrated in FIG. 2C, an "Author/Edit Comments" button 225 is provided. Selection of the button 225 may cause a launching of a comment user interface dialog box for allowing entry or editing of one or more comments contained therein, for example, the comments 205, 210.

Alternatively, selection of the "Author/Edit Comments" button 225 may cause a launching of a comments user interface component 230, as illustrated in FIG. 2D, in which may be contained one or more comments functionality buttons and controls provided by the comments application 920 for interacting with one or more comments. For example, a "New" button 232 is provided for allowing a user to start and enter a new comment. A "Reply" button 234 allows for the entry of a responsive comment 210. A "Delete" button 236 allows for the deletion of a selected comment.

A "Read" button 238 allows for the marking of a given comment by a given user as having been read so that other users will know that the first user has reviewed the given comment. An "Unread" button 240 may allow a user to mark a comment as unread so that the comment will not be deleted or altered by other users. A "Close" button 242 may allow a user to close a comment from view, and a "Feedback" button 244 may allow a user to provide feedback on the comments of other users. Such feedback may be provided in a comment or may be assembled for review via a separate feedback document or medium. The "Close" button 250 may be used for collapsing the comments user interface component out of view as illustrated in FIG. 2C. As should be appreciated, the user interface components illustrated and described herein are for purposes of example and are not limiting of the vast numbers of display styles and orientations that may be used, nor is the listing of functionality controls limiting of other functionality controls that may be included in such user interface components.

According to an embodiment, the buttons or controls 232-244 may allow for creating, modifying and annotating comments that will be reviewed by others, as described above. Alternatively, such functionality controls may also be utilized for creating, modifying and annotating comments for the primary user of the associated document. That is, a user may utilize such functionality controls to help him/her in a review or editing of the document where, for example, the user might mark a comment as "read" to remind himself/herself that he/she has read the comment, or the user might mark a comment as "unread" to remind himself/herself that he/she has not read the comment.

Figure 3A:
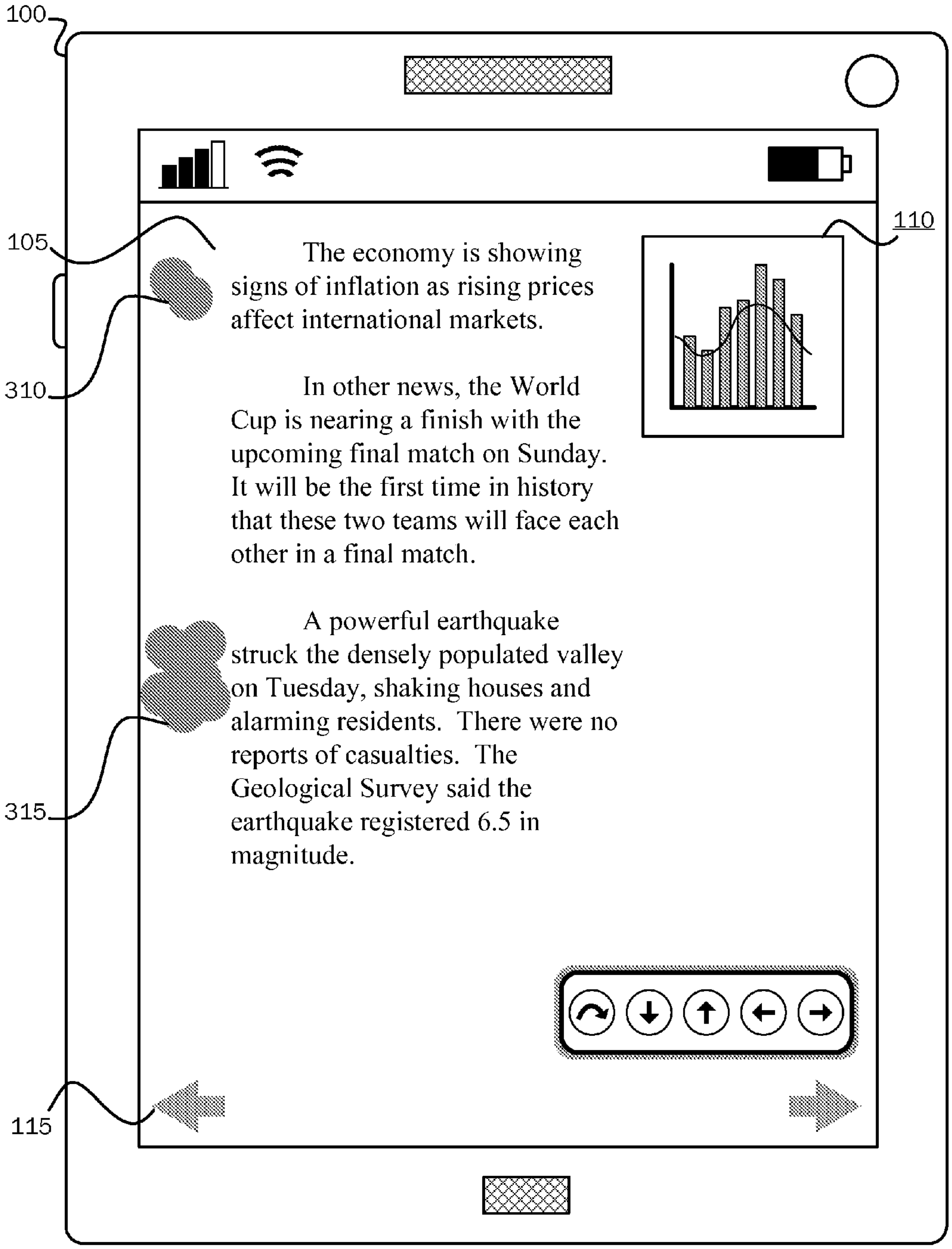
FIG. 3A is a simplified block diagram illustrating a computer-generated display on which is displayed document content and showing a displayed icon or image associated with one or more comments applied to the displayed document content.

Referring now to FIG. 3A, the comments tab 125, illustrated in FIGS. 1 and 2A, may be collapsed and may be replaced by an image or icon 310, 315 that may be displayed in a side margin of a document 105 or other content item adjacent to a location at which a comment has been entered. Collapsing the comments tab 125 out of view may allow users to review a given document 105 or other content item without any clutter caused by the addition of any non-document/content item material, including the comments tab 125. According to an embodiment, an example icon or image that may be used to indicate the presence of an embedded comment may take the form of a "paint splotch" type image 310, 315 that may provide a pleasant, unobtrusive indication that one or more embedded comments exists in the associated document or content item near the displayed image 310, 315. As should be appreciated, the use of "paint splotch" images to indicate the presence of embedded comments is for purposes of illustration and example only. Any acceptable image or icon may be used for indicating the presence of an embedded comment. For example, a star-shaped image, a ball-shaped image, an avatar-shaped image, an animal-shaped image, and the like may be used to indicate the presence of an embedded comment. According to one embodiment, users may select the comment indicating images 310, 315 from a variety of available images that may be used for displaying and for indicating the presence of associated embedded comments, as desired.

According to an embodiment, the number of "paint splotch" images or icons 310, 315 displayed in the margin of the document or other content item may correspond to the number of comments that are embedded at the associated location. For example, the image 310 includes two example paint splotches grouped together which may be used to indicate that two comments are embedded in the document or other content item at that location. The paint splotch grouping 315 includes a number of paint splotch images (e.g., eight or more) which may indicate that a number of comments are embedded in the associated document or content item at that location. Alternatively, the display of such "paint splotch" type images may be displayed in relative terms. For example, 500 comments applied to one portion of a document versus 50 comments applied to a second portion of the document would not require the display of 500 "paint splotches" and 50 "paint splotches" to show a comparison of the numbers of comments applied to the two document portions.

Figure 3B:
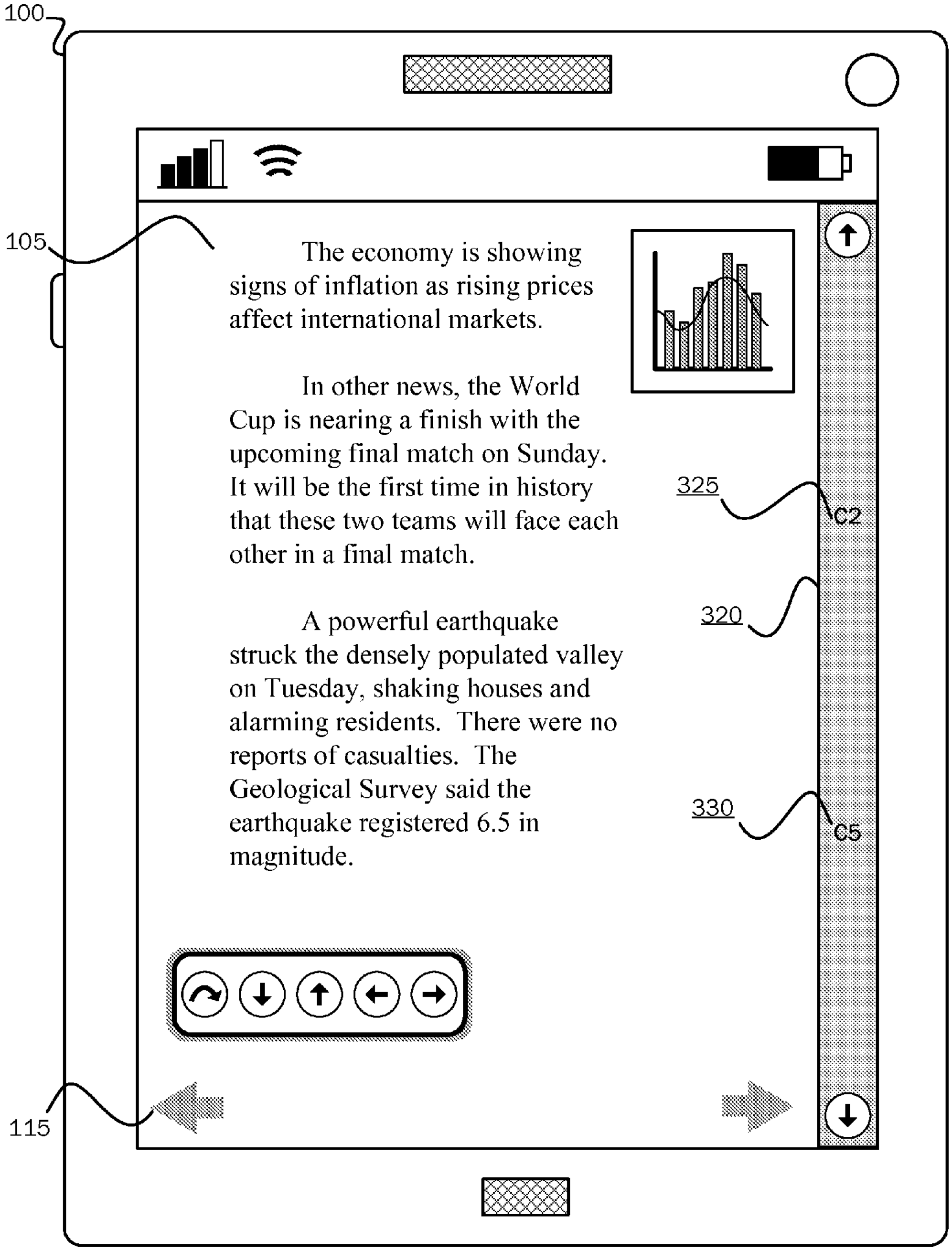
FIG. 3B is a simplified block diagram illustrating a computer-generated display on which is displayed document content and showing a displayed scroll bar in which may be indicated locations of comments applied to the displayed document.

Referring now to FIG. 3B, a scroll bar 320 is disposed along one side of the document interface for scrolling document content upward and downward for navigating from one portion of the document to another. According to embodiments, comments indicators 325,330 may be displayed in the scroll bar at positions relative to comments applied to the corresponding document content. For example, a first comments indicator 325 is displayed as a "C2" indicator and indicates that two comments are included in the associated document at a point in the document corresponding to that point in the scroll bar. The use of the indicator "C2" is only an example and is not limiting of other types of indicators that may be displayed in the scroll bar 320. Thus, according to this embodiment, as a user scrolls through a document, comments indicators appearing in the scroll bar at various points will give the user a quick and easy understanding as to the locations and numbers of comments that have been applied to the document at various points in the document.

According to one embodiment, the comments indicators (e.g., "C2") 325,330 displayed in the scroll bar 320 may be active functionality controls which when selected cause an automatic "jump" to the associated comment(s). Selection of the comments indicators 325,330 may also be used to cause an automatic opening of the associated comment in-line in the document 105 if the comment is not already open for review and editing. In addition, focusing on the comments indicators, for example, mouse-over or hover over the comments indicators, may cause a display of a pop-up, bubble, tooltip or other user interface component in which may be displayed a portion or all of the associated comment(s).

Figure 4:
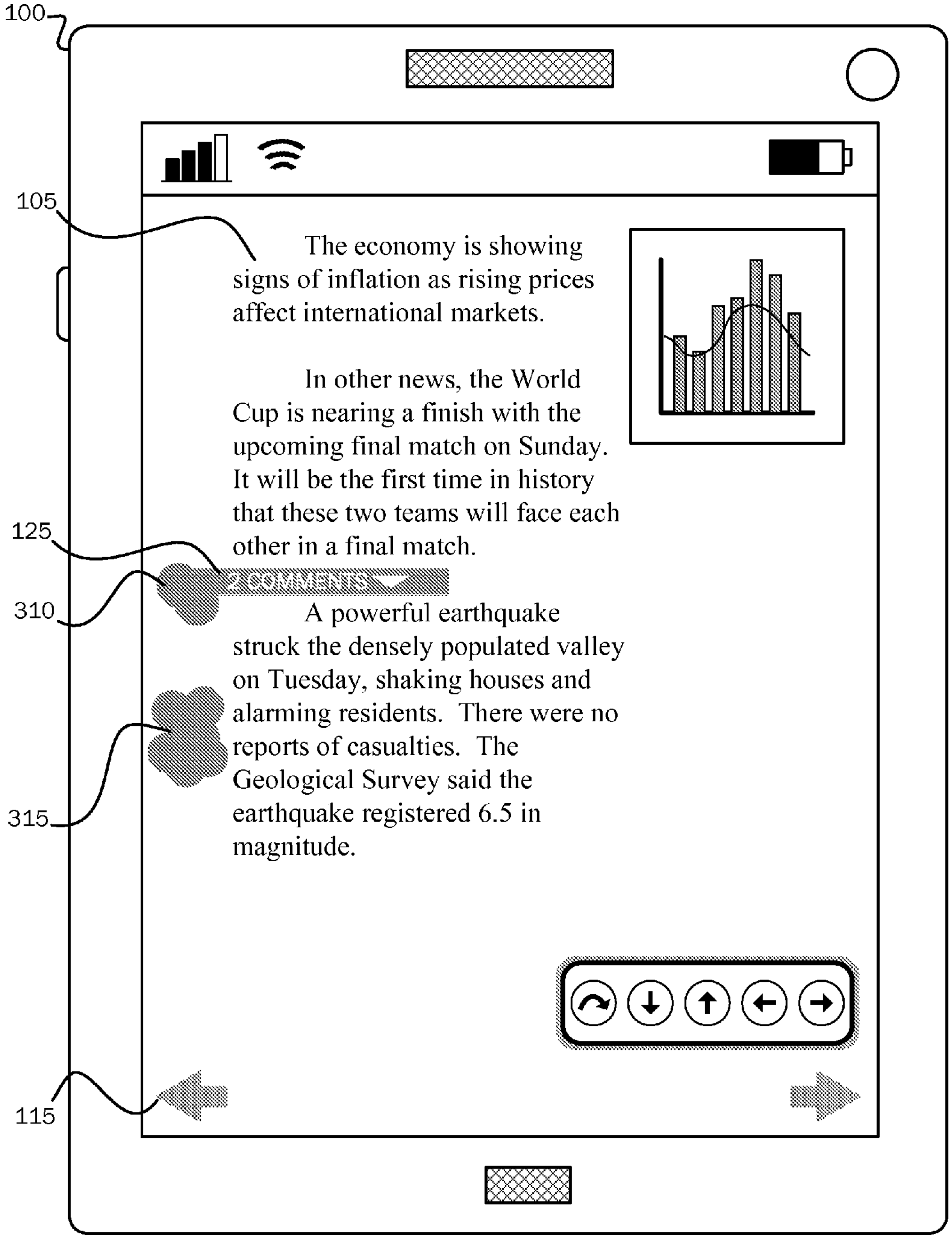
FIG. 4 is a simplified block diagram illustrating a computer-generated display on which is displayed document content and showing an expanded comments tab in association with a selectable comments indication icon or image.
Figure 5:
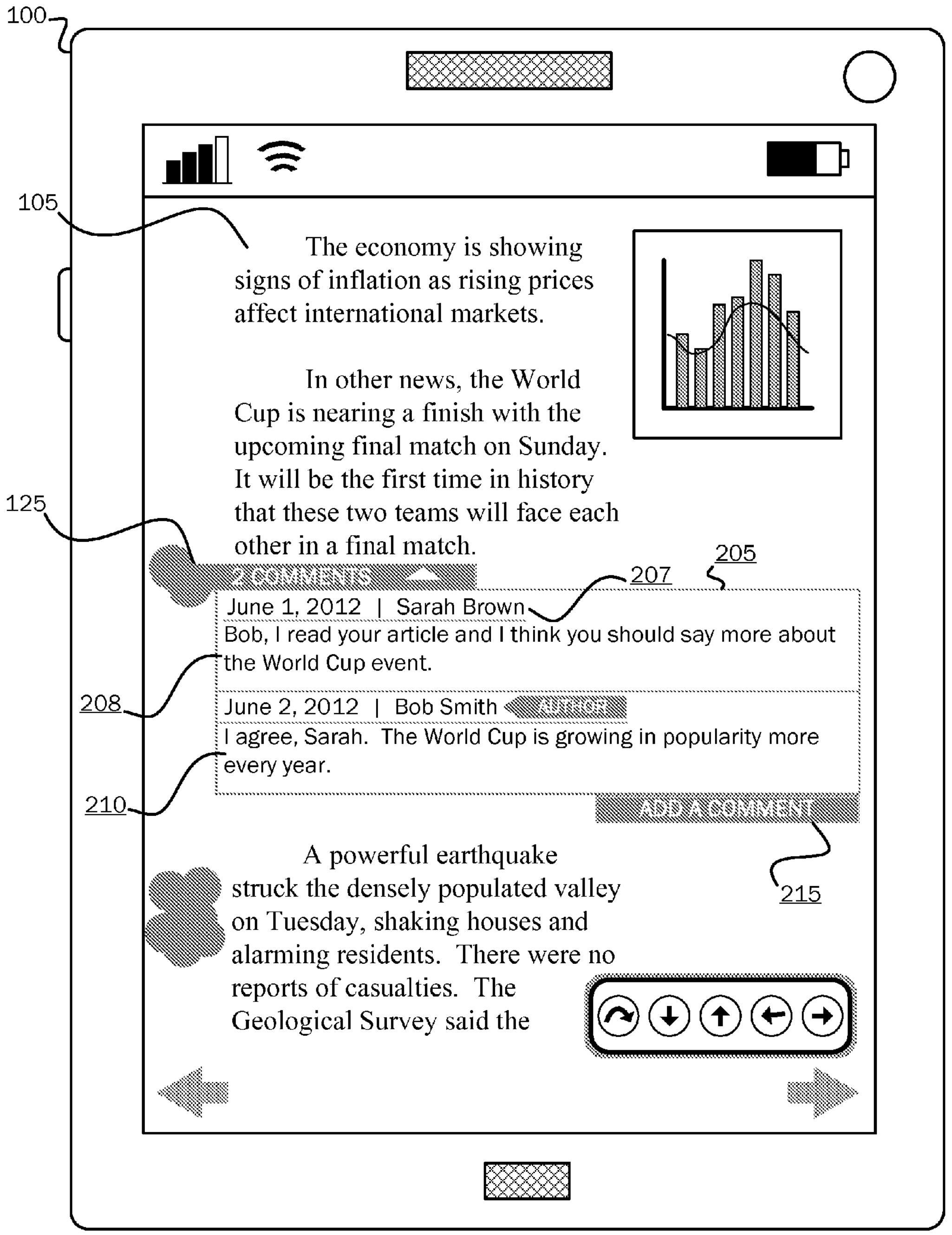
FIG. 5 is a simplified block diagram illustrating a computer-generated display on which is displayed document content and showing an expanded comments interface for showing one or more comments associated with the displayed document content.

Referring now to FIG. 4, when a user focuses on one of the comment indicating images 310, 315 by a suitable input means, for example, by hovering a mouse cursor over the image 310, by touching the image 310, by gesturing to the image 310, by an associated key stroke, or by voice command, the comments tab 125 may be expanded to expose the comments tab for use as described above with reference to FIGS. 1 and 2. As illustrated in FIG. 5, selection of the expanded comments tab 125 then may cause expansion of the comments user interface component 205 to show embedded comments and to allow a user to enter new comments, responsive comments, and the like, as described above with reference to FIG. 2.

Figure 6:
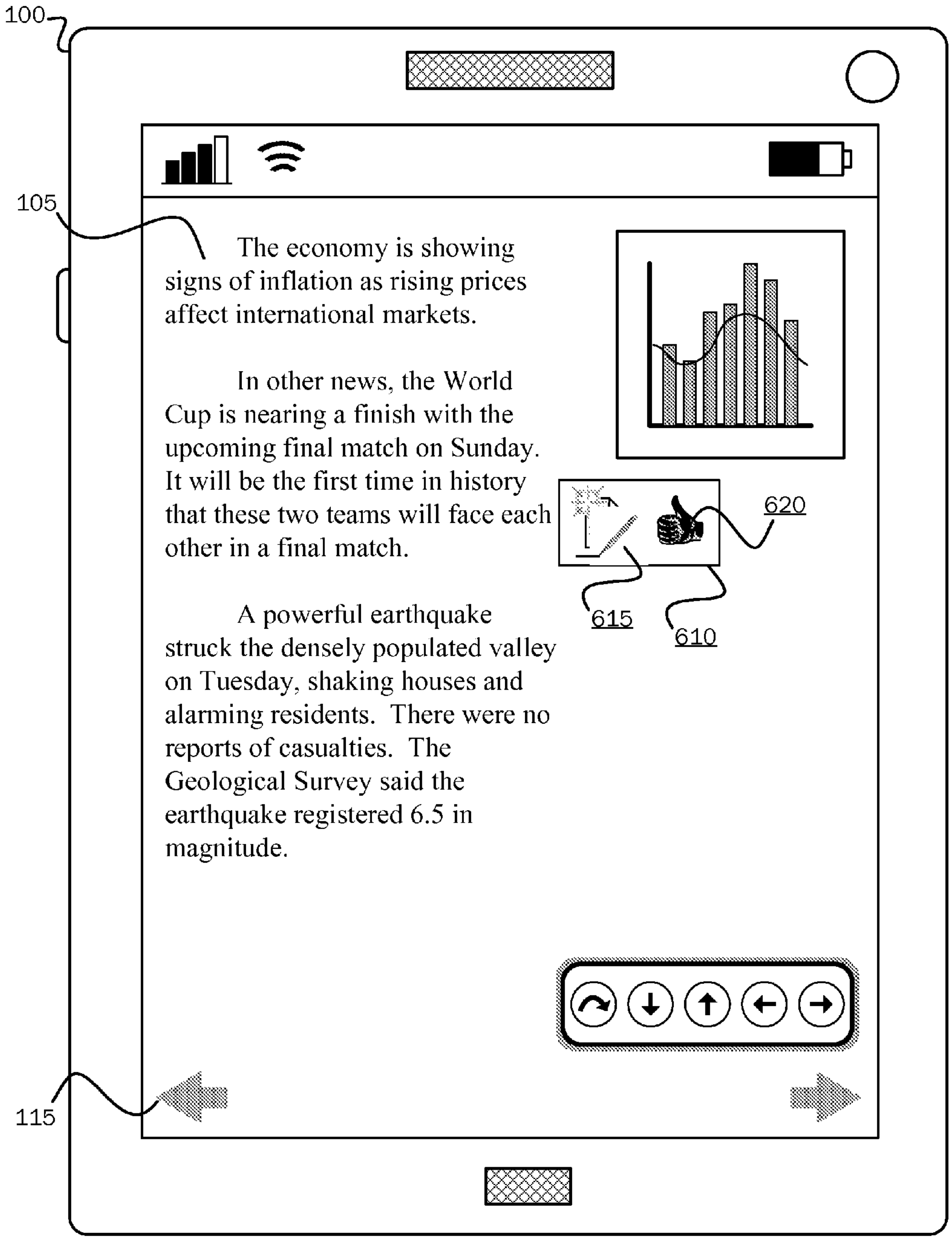
FIG. 6 is a simplified block diagram illustrating a computer-generated display on which is displayed document content and showing a social feedback image and comments user interface control.

According to embodiments, one or more social feedback mechanisms may be employed for allowing users to provide feedback on a document 105, content item, or a component or portion of a document or content item without the requirement of entering text or other content in the comments user interface component 205, as described above. Referring now to FIG. 6, according to one embodiment a social feedback component 610 may be provided with which a user may provide a quick social feedback item 620 for applying a user feedback level to a portion or component of a content item. For example, a "thumbs up" image may be applied to indicate approval or satisfaction with an associated content item component or portion or a “thumbs down” image may be applied to provide a quick disapproval or dissatisfaction indication for an associated content item component or portion. For example, a reviewer may read a document offered by another user, and if the reviewer is particularly satisfied with a given paragraph in the document, the reviewer may selectively enter a “thumbs up” image 620 next to the associated paragraph to indicate his/her satisfaction with the example paragraph. Likewise, if the reviewer is not satisfied with the associated paragraph or otherwise disapproves of the associated paragraph, the reviewer may selectively display a “thumbs down” image 620 to visually indicate the reviewer’s disapproval or dissatisfaction with the associated example paragraph.

The entered images 620 may remain displayed next to the reviewed content portion or component for other users to see. According to one embodiment, identification information, such as the initials of the reviewer, may be displayed with the image 620 to provide other users information about the feedback. Other information that may be displayed with the image 620 may include a date and/or time of the entry of the image 620.

As should be appreciated, a variety of other acceptable images 620 may be used for this feedback purpose, for example, a smiley face for approval, a frowning face for disapproval, a happy avatar for approval, an unhappy avatar for disapproval, and the like. As should be appreciated, almost a limitless number of such images may be employed for allowing a reviewer to quickly indicate satisfaction, dissatisfaction, approval, disapproval, and the like in association with a component or portion of a given document or content item. In addition to many different images that may be used, many different forms of rating likewise may be used, for example, a number of stars to indicate varying levels of satisfaction or a simple “like” tag applied to indicate basic satisfaction, and the like.

Referring still to FIG. 6, adjacent to the social feedback image 620 is a comments icon 615 that may be selected from the feedback interface component 610 for launching the comments user interface component 205, described above with reference to FIG. 2, to allow the reviewer to enter text or other content as a comment for the associated document or content item component or portion. For example, a given user may indicate dissatisfaction or disapproval with a given paragraph of a document 105, followed by selection of the comments icon 615 to launch the comments user interface component 205, and followed by entry of a comment expressing the reasons for the reviewer’s disapproval or dissatisfaction with the associated content.

According to an embodiment, the feedback interface component 610 may be launched according to a variety of suitable input means or functionalities. For example, a user may hover a mouse cursor along a side margin of a document 105 followed by a right click at which the user may be provided a variety of options including an option to enter comments. Selection of an option for entering comments may cause a display of the feedback interface component 610 to allow the user to provide a feedback image 620 or to allow the user to launch the comments user interface component 205, as described above.

As illustrated in FIG. 7, according to an alternative embodiment, a meter/indicator 705 may be displayed adjacent to portions of a document 105 or content item, for example, adjacent to a paragraph, page, or section of a given document, to allow various users to indicate approval, disapproval, satisfaction or dissatisfaction with adjacently displayed components or portions of a document or other content item. As should be appreciated, illustration of the indicator 705 adjacent to portions of a document or content item is for purposes of example. For another example, a high level view of the entire document may be displayed, and an indicator 705 may be shown in proximity to the high level display of the document or in a table of contents, or in a document or content navigation map, or in any other suitable location.

According to one embodiment, the meter/indicator 705 may be in the form of a “heat map” meter where a level of approval, disapproval, satisfaction or dissatisfaction may be displayed in terms of colors to show temperatures associated with feedback (e.g., red is hot or highly approved, white is cool or highly disapproved). As illustrated in FIG. 7, the meter/indicator 705 may employ a variety of means for indicating approval, disapproval, satisfaction or dissatisfaction according to an associated scale. For example, high satisfaction with a displayed portion of a document or other content item 105 may be indicated by a color, such as the color red 730. A medium satisfaction may be indicated with a color, such as the color pink 735, a low satisfaction may be indicated with a color, such as the color gray 740, a very low satisfaction may be indicated with a color such as the color white, and so on. As should be appreciated, other feedback indications may be employed, including numeric indications, for example, a scale of 1 to 10 where 10 is high satisfaction and 1 is low satisfaction, or any other appropriate visual means for indicating varying levels of approval, disapproval, satisfaction, dissatisfaction.

Consider, for example, that the document 105 is comprised of two pages 710 and 720, as illustrated in FIG. 7. Upon command, for example, by right clicking in the left margin followed by selecting a feedback meter/indicator, the feedback meters/indicators 705 may be displayed adjacent to the pages 710, 720, as illustrated in FIG. 7. As a reviewer reads through the text or other content items 105 contained in the pages 710, 720, the reviewer may provide input to the meters/indicators 705 to indicate approval, disapproval, satisfaction, dissatisfaction. For example, if the user highly approves or is highly satisfied with a given paragraph, the user may provide input to the meter/indicator 705 adjacent to the associated paragraph by clicking on the meter/indicator at that location numerous times to cause the color of the meter in that location to change to a color associated with high approval or high satisfaction. That is, the display of the selected portion of the feedback meter may be altered to indicate feedback is received in varying levels from one or more users in association with the portion of the first content item associated with the selected portion of the feedback meter. Alternatively, an input means may be provided wherein a user may select the meter/indicator to cause a pop-up menu to be provided from which the user may be able to select varying levels of approval, disapproval, satisfaction, dissatisfaction for causing the heat map meter/indicator to be displayed according to the selected feedback level.

According to embodiments, the meter/indicator 705 may be associated with a particular version of a document. Thus, as the document is edited or changed to a second or subsequent different version, the meter/indicator 705 may be cleared of feedback to allow new feedback to be applied by various users to the new version of the document or other content item.

As should be appreciated, the feedback provided by a single user may be saved for that user, and other feedback settings for the same document or other content item may be saved for other users. Alternatively, feedback may be provided in a collaborative environment wherein other users may provide feedback via the same feedback meter/indicator 705 utilized by other users so that a consolidated feedback is obtained. For example, if one user is highly dissatisfied with a paragraph of a document 105 and provides feedback associated with disapproval or dissatisfaction, but numerous other users provide feedback for the same content item that shows high satisfaction or high approval, then the group of users or reviewers indicating high satisfaction may overcome the negative review or negative feedback provided by the one user.

As should be appreciated, the feedback mechanisms and illustrations described herein with respect to FIGS. 6 and 7 are for purposes of example only and are not limiting of a vast number of displays and display orientations that may be used in association with documents or other content items to allow reviewers to indicate approval, disapproval, satisfaction, dissatisfaction in varying degrees in association with the reviewed content.

Figure 8:
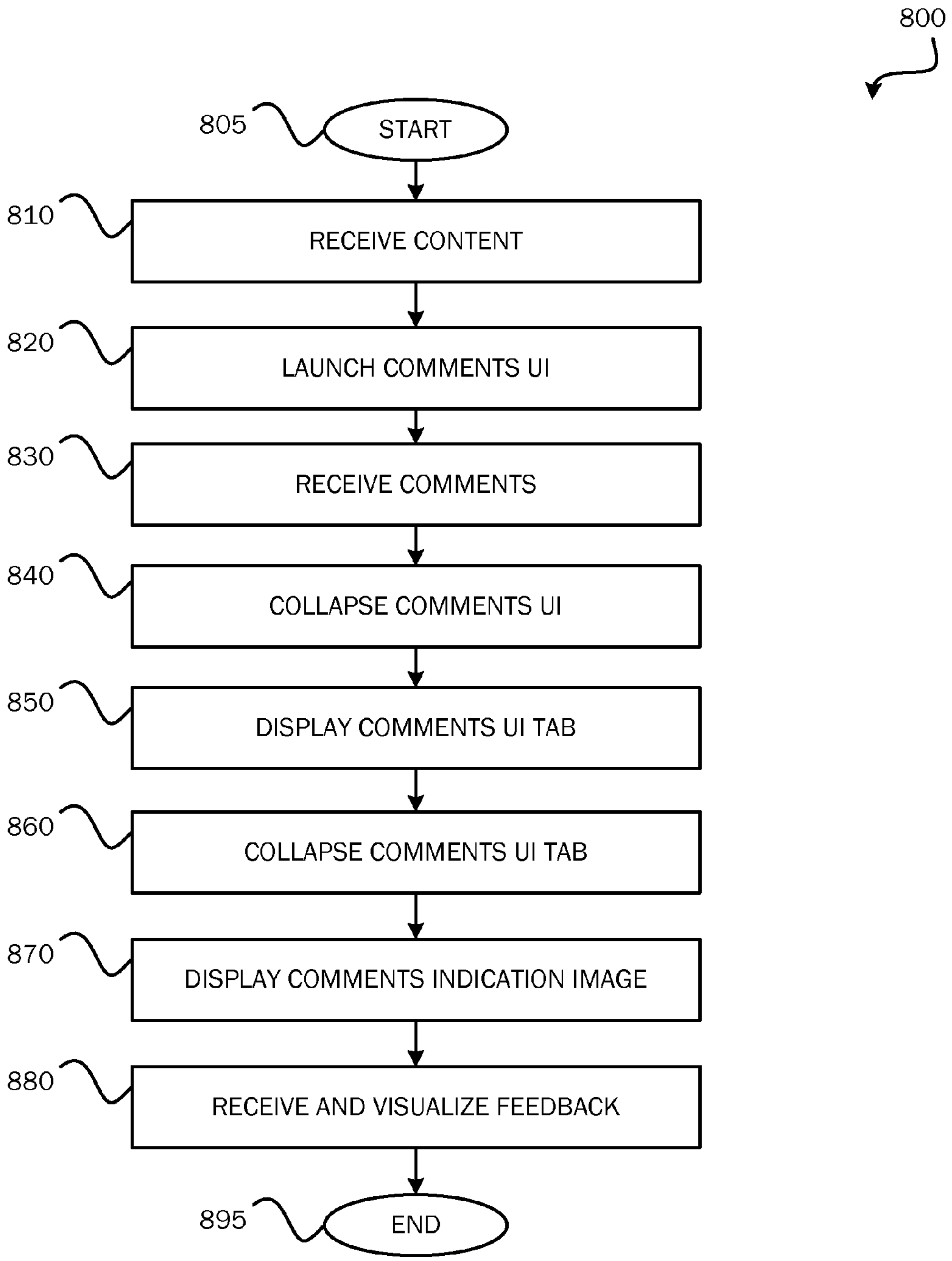
FIG. 8 is a flow chart illustrating a method for utilizing comments and feedback in association with one or more content items.

FIG. 8 is a flow chart illustrating a method for utilizing comments and feedback in association with one or more content items. The routine 800 begins at start operation 805 and proceeds to operation 810 where one or more content items, for example, a document 105, as illustrated in FIGS. 1-7 above, may be displayed for editing, manipulating, or otherwise interacting with. At operation 820, a user, reviewer, or comment provider, may launch the comments user interface component 205, as illustrated above with respect to FIG. 2. According to one embodiment, the comments user interface component 205 may be launched from a comments button or control provided in an array of application functionality buttons or controls, or the comments user interface component 205 may be launched from a comments user interface component 610, as illustrated and described above with respect to FIG. 6.

At operation 830, one or more comments may be received by a user, reviewer, or comment provider in the comments user interface component 205, as illustrated above with respect to FIG. 2. At operation 840, if desired, the comments user interface 205 may be collapsed into the comments tab 125, as illustrated above with respect to FIG. 1. At operation 850, the comments user interface tab 125 may be displayed in a position in the associated document 105 or other content item relative to the location of the embedded comments.

At operation 860, the comments tab 125 may be collapsed, and at operation 870, a comments indication image/icon 310, 315 may be displayed to indicate the presence of one or more comments, as illustrated and described above with reference to FIG. 3. As should be appreciated, the comments indication image/icon may be expanded back to the comments tab 125 by focusing on the comments indication image/icon, and the comments tab 125 may be expanded back to the comments user interface component 205, as described above.

At operation 880, feedback in association with a component or portion of a document or other content item may be received. Received feedback may be displayed in one or more feedback visualizations 610,705, as illustrated and described above with reference to FIGS. 6 and 7. The routine 800 ends at operation 895.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 9-11 and the associated descriptions provide a discussion of a variety of operating environments in which embodiments of the invention may be practiced. However, the devices and systems illustrated and discussed with respect to FIGS. 9-11 are for purposes of example and illustration and are not limiting of a vast number of computing device configurations that may be utilized for practicing embodiments of the invention, described herein.

Figure 9:
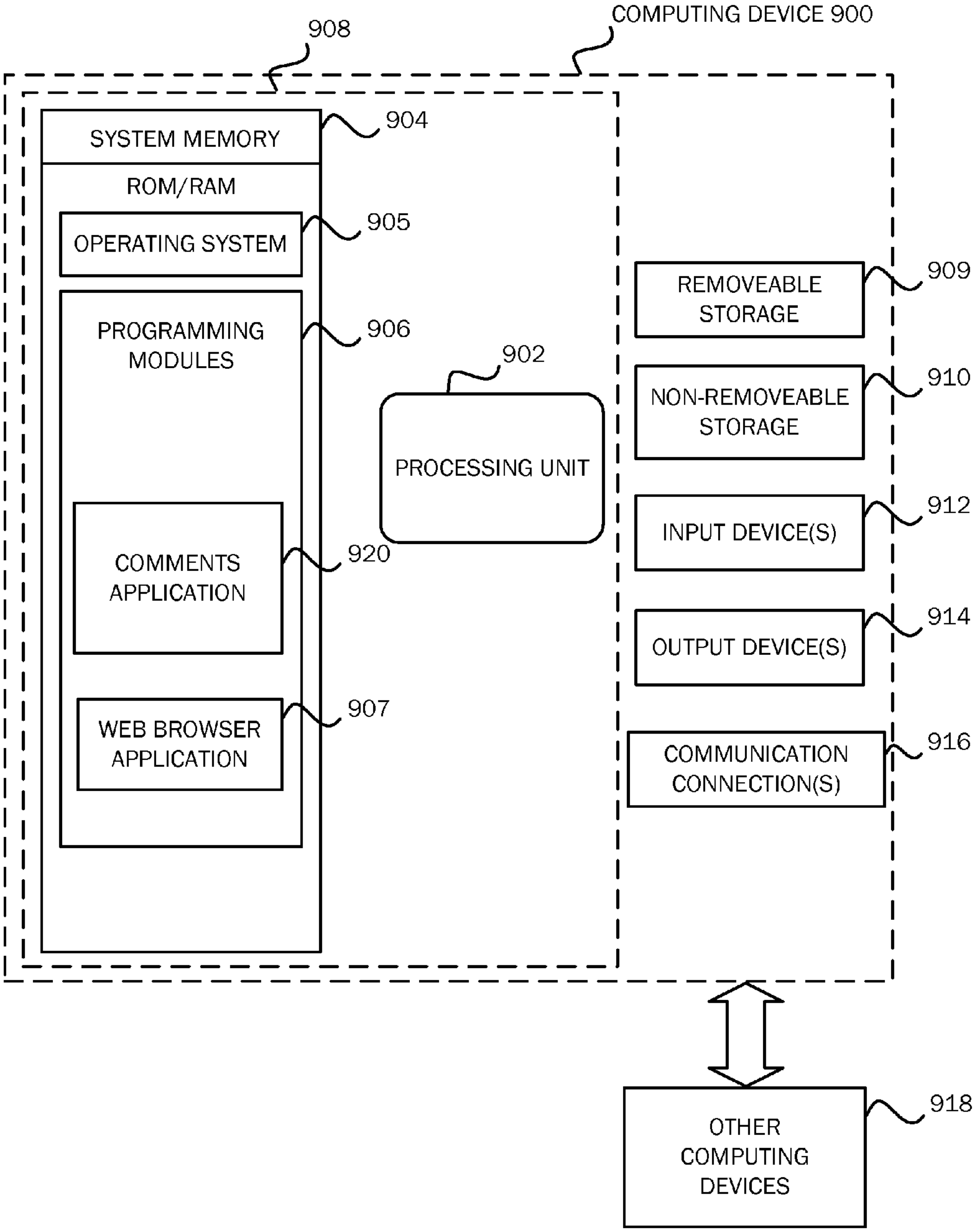
FIG. 9 is a simplified block diagram of a computing device with which embodiments of the present invention may be practiced.

FIG. 9 is a block diagram illustrating example physical components of a computing device 900 with which embodiments of the invention may be practiced. The computing device components described below may be suitable for the computing devices described above, for example, the computing device 100. In a basic configuration, computing device 900 may include at least one processing unit 902 and a system memory 904. Depending on the configuration and type of computing device, system memory 904 may comprise, but is not limited to, volatile (e.g. random access memory (RAM)), non-volatile (e.g. read-only memory (ROM)), flash memory, or any combination. System memory 904 may include operating system 905, one or more programming modules 906, and may include the comments application 920. Operating system 905, for example, may be suitable for controlling computing device 900's operation. Furthermore, embodiments of the invention may be practiced in conjunction with a graphics library, other operating systems, or any other application program and is not limited to any particular application or system. This basic configuration is illustrated in FIG. 9 by those components within a dashed line 908.

Computing device 900 may have additional features or functionality. For example, computing device 900 may also include additional data storage devices (removable and/or non-removable) such as, for example, magnetic disks, optical disks, or tape. Such additional storage is illustrated in FIG. 9 by a removable storage 909 and a non-removable storage 910.

As stated above, a number of program modules and data files may be stored in system memory 904, including operating system 905. While executing on processing unit 902, programming modules 906, such as the comments application 920 may perform processes including, for example, one or more method 800's stages as described above. The aforementioned process is an example, and processing unit 902 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to comments application 920 may be operated via application-specific logic integrated with other components of the computing device/system 900 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. System memory 904, removable storage 909, and non-removable storage 910 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 900. Any such computer storage media may be part of device 900. Computing device 900 may also have input device(s) 912 such as a keyboard, a mouse, a pen, a sound input device, a touch input device, etc. Output device(s) 914 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 10A:
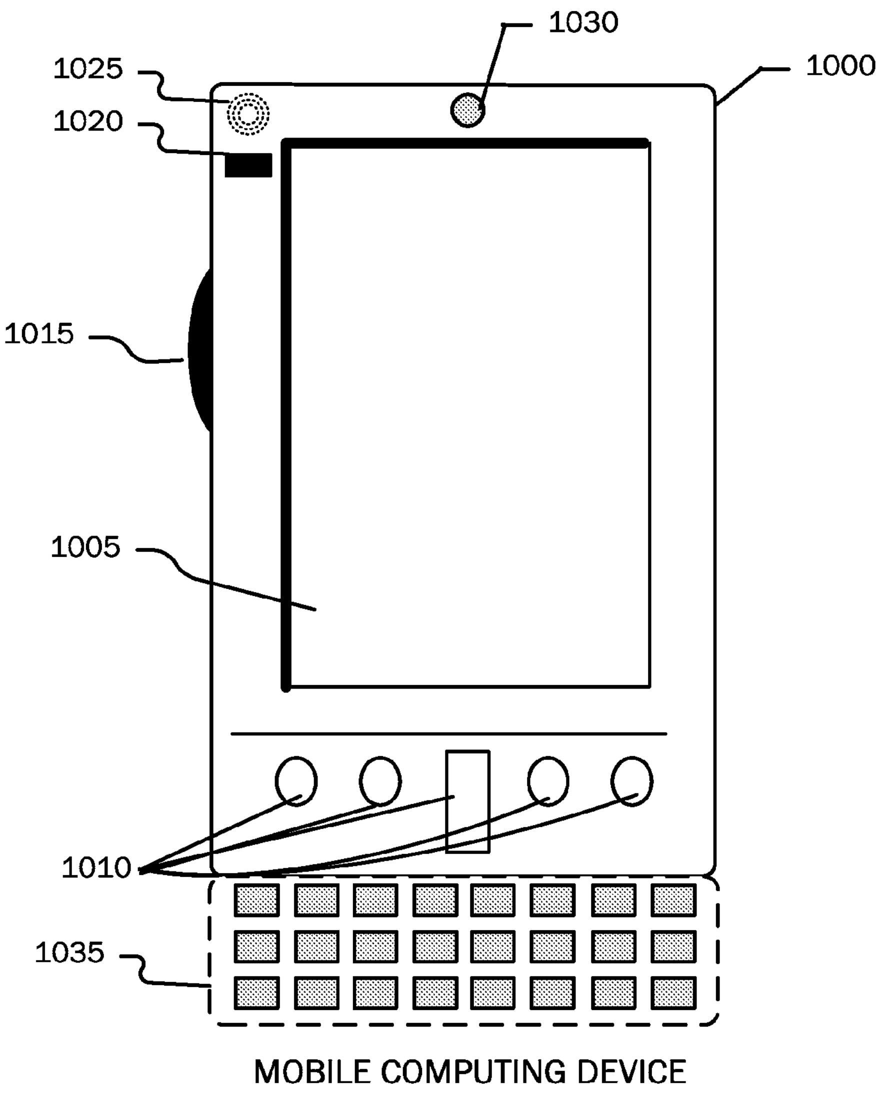
FIGS. 10A and 10B are simplified block diagrams of a mobile computing device with which embodiments of the present invention may be practiced.
Figure 10B:
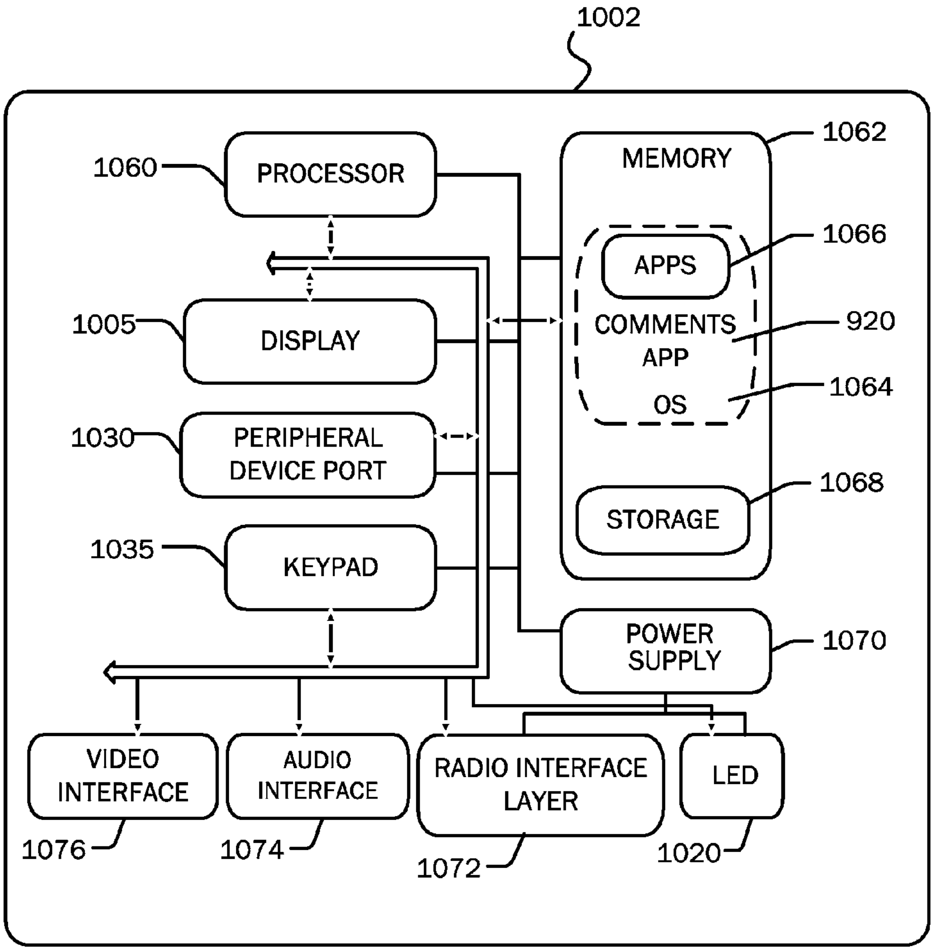

FIGS. 10A and 10B illustrate a suitable mobile computing environment, for example, a mobile telephone, a smart phone, a tablet personal computer, a laptop computer, and the like, with which embodiments of the invention may be practiced. With reference to FIG. 10A, an example mobile computing device 1000 for implementing the embodiments is illustrated. In a basic configuration, mobile computing device 1000 is a handheld computer having both input elements and output elements. Input elements may include touch screen display 1005 and input buttons 1010 that allow the user to enter information into mobile computing device 1000. Mobile computing device 1000 may also incorporate an optional side input element 1015 allowing further user input. Optional side input element 1015 may be a rotary switch, a button, or any other type of manual input element. In alternative embodiments, mobile computing device 1000 may incorporate more or less input elements. For example, display 1005 may not be a touch screen in some embodiments. In yet another alternative embodiment, the mobile computing device is a portable phone system, such as a cellular phone having display 1005 and input buttons 1010. Mobile computing device 1000 may also include an optional keypad 1035. Optional keypad 1035 may be a physical keypad or a "soft" keypad generated on the touch screen display.

Mobile computing device 1000 incorporates output elements, such as display 1005, which can display a graphical user interface (GUI). Other output elements include speaker 1025 and LED light 1020. Additionally, mobile computing device 1000 may incorporate a vibration module (not shown), which causes mobile computing device 1000 to vibrate to notify the user of an event. In yet another embodiment, mobile computing device 1000 may incorporate a headphone jack (not shown) for providing another means of providing output signals.

Although described herein in combination with mobile computing device 1000, in alternative embodiments the invention is used in combination with any number of computer systems, such as in desktop environments, laptop or notebook computer systems, multiprocessor systems, microprocessor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present invention.

FIG. 10B is a block diagram illustrating components of a mobile computing device used in one embodiment, such as the computing device shown in FIG. 10A. That is, mobile computing device 1000 can incorporate system 1002 to implement some embodiments. For example, system 1002 can be used in implementing a "smart phone" that can run one or more applications similar to those of a desktop or notebook computer such as, for example, browser, e-mail, scheduling, instant messaging, and media player applications. In some embodiments, system 1002 is integrated as a computing device, such as an integrated personal digital assistant (PDA) and wireless phone.

One or more application programs 1066 may be loaded into memory 1062 and run on or in association with operating system 1064. Examples of application programs include phone dialer programs, e-mail programs, PIM (personal information management) programs, word processing programs, spreadsheet programs, Internet browser programs, messaging programs, and so forth. System 1002 also includes non-volatile storage 1068 within memory 1062. Non-volatile storage 1068 may be used to store persistent information that should not be lost if system 1002 is powered down. Applications 1066 may use and store information in non-volatile storage 1068, such as e-mail or other messages used by an e-mail application, and the like. A synchronization application (not shown) also resides on system 1002 and is programmed to interact with a corresponding synchronization application resident on a host computer to keep the information stored in non-volatile storage 1068 synchronized with corresponding information stored at the host computer. As should be appreciated, other applications may be loaded into memory 1062 and run on the device 1000, including the comments application 920, described herein.

System 1002 has a power supply 1070, which may be implemented as one or more batteries. Power supply 1070 might further include an external power source, such as an AC adapter or a powered docking cradle that supplements or recharges the batteries.

System 1002 may also include a radio 1072 that performs the function of transmitting and receiving radio frequency communications. Radio 1072 facilitates wireless connectivity between system 1002 and the "outside world", via a communications carrier or service provider. Transmissions to and from radio 1072 are conducted under control of OS 1064. In other words, communications received by radio 1072 may be disseminated to application programs 1066 via OS 1064, and vice versa.

Radio 1072 allows system 1002 to communicate with other computing devices, such as over a network. Radio 1072 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 1002 is shown with two types of notification output devices; LED 1020 that can be used to provide visual notifications and an audio interface 1074 that can be used with speaker 1025 to provide audio notifications. These devices may be directly coupled to power supply 1070 so that when activated, they remain on for a duration dictated by the notification mechanism even though processor 1060 and other components might shut down for conserving battery power. LED 1020 may be programmed to remain on indefinitely until the user takes action to indicate the powered-on status of the device. Audio interface 1074 is used to provide audible signals to and receive audible signals from the user. For example, in addition to being coupled to speaker 1025, audio interface 1074 may also be coupled to a microphone to receive audible input, such as to facilitate a telephone conversation. In accordance with embodiments of the present invention, the microphone may also serve as an audio sensor to facilitate control of notifications, as will be described below. System 1002 may further include video interface 1076 that enables an operation of on-board camera 1030 to record still images, video stream, and the like.

A mobile computing device implementing system 1002 may have additional features or functionality. For example, the device may also include additional data storage devices (removable and/or non-removable) such as, magnetic disks, optical disks, or tape. Such additional storage is illustrated in FIG. 10B by storage 1068. Computer storage media may include volatile and nonvolatile, removable and non-removable media implemented in any method or technology for storage of information, such as computer readable instructions, data structures, program modules, or other data.

Data/information generated or captured by the device 1000 and stored via the system 1002 may be stored locally on the device 1000, as described above, or the data may be stored on any number of storage media that may be accessed by the device via the radio 1072 or via a wired connection between the device 1000 and a separate computing device associated with the device 1000, for example, a server computer in a distributed computing network, such as the Internet. As should be appreciated such data/information may be accessed via the device 1000 via the radio 1072 or via a distributed computing network. Similarly, such data/information may be readily transferred between computing devices for storage and use according to well-known data/information transfer and storage means, including electronic mail and collaborative data/information sharing systems.

Figure 11:
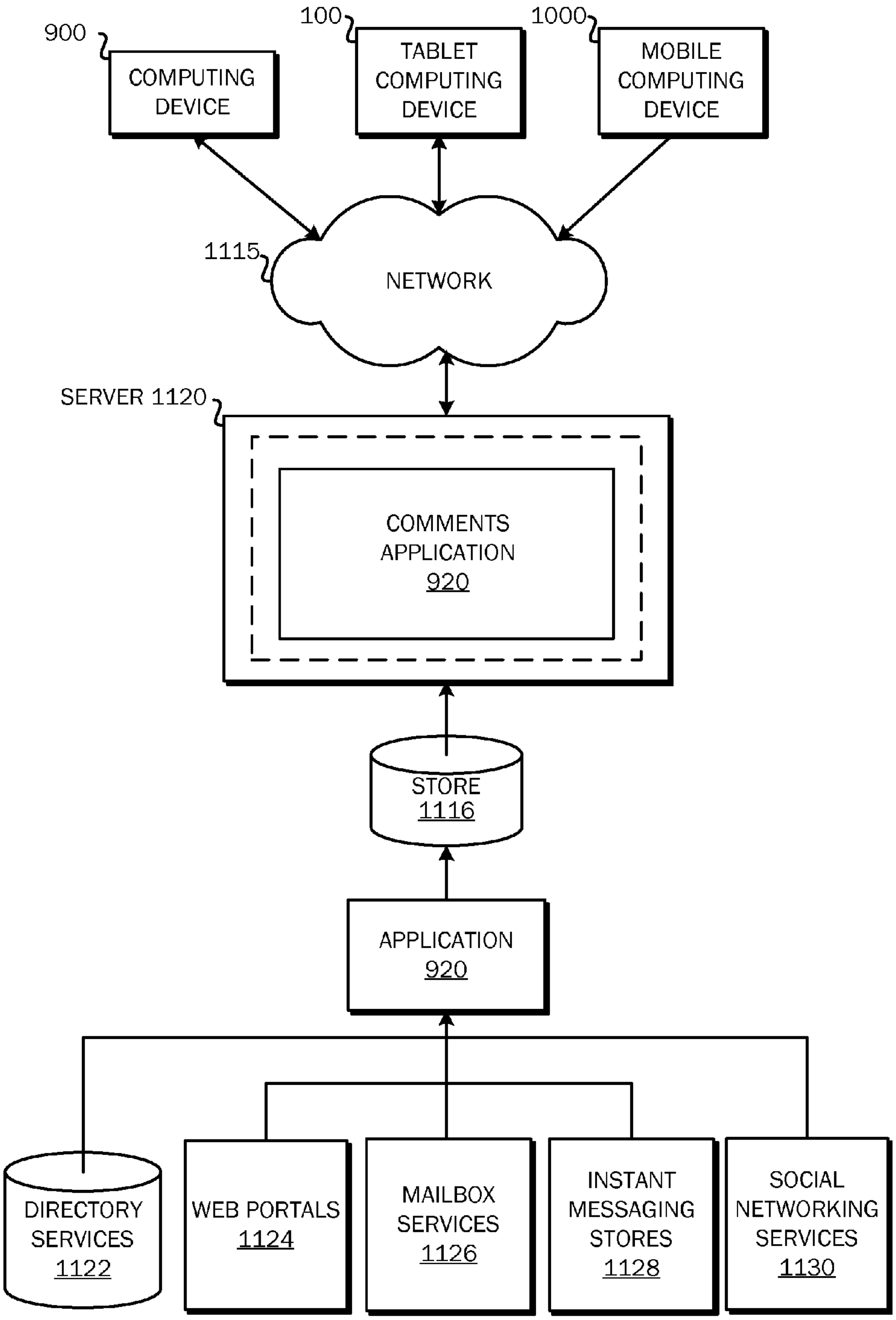
FIG. 11 is a simplified block diagram of a distributed computing system in which embodiments of the present invention may be practiced.

FIG. 11 illustrates a system architecture for providing comments in one or more content items to one or more client devices, as described above. Content developed, interacted with or edited in association with a comments application may be stored in different communication channels or other storage types. For example, various content items along with information from which they are developed may be stored using directory services 1122, web portals 1124, mailbox services 1126, instant messaging stores 1128 and social networking sites 1130. The comments application 920 may use any of these types of systems or the like for enabling content utilization, as described herein. A server 1120 may provide content items and comments to clients. As one example, server 1120 may be a web server providing content and comments over the web. Server 1120 may provide online content and comments over the web to clients through a network 1115. Examples of clients that may obtain content and comments include computing device 900, which may include any general purpose personal computer, a tablet computing device 100 and/or mobile computing device 1000 which may include smart phones. Any of these devices may obtain content from the store 1116.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method of providing a graphical representation of feedback associated with an electronic content item, comprising:
- displaying a content item in a computer-enabled interface;
- providing access to the content item for a plurality of reviewers via a collaborative environment;
- displaying a feedback interface component within the computer-enabled interface, in response to receiving an instruction to launch the feedback interface component;
- receiving, in the feedback interface component, feedback from a reviewer, wherein the feedback indicates a satisfaction associated with a portion of a plurality of portions in the content item; and
- displaying a feedback indicator and comment icon in the feedback interface component, wherein the feedback indicator graphically represents the satisfaction associated with a respective, selected portion of the plurality of portions in the content item, the feedback interface component, including the feedback indicator and comment icon, being displayed at a location depending on the respective, selected portion of the plurality of portions that is associated with the feedback;
- displaying, in response to selection of the comment icon in the feedback interface component, a comment user interface for receiving a comment relating to the feedback.

2. The method of claim 1, wherein each feedback indicator displays varying levels of satisfaction associated with the plurality of portions in the content item.

3. The method of claim 2, wherein the varying levels of satisfaction are associated with colors to graphically represent the satisfaction associated with each of the plurality of portions in the content item.

4. The method of claim 2, wherein the varying levels of satisfaction are associated with numeric values to graphically represent the satisfaction associated with each of the plurality of portions in the content item.

5. The method of claim 1, wherein the feedback indicator further comprises a feedback indicator that displays an image indicating satisfaction or an image indicating dissatisfaction.

6. The method of claim 1, wherein displaying the feedback indicator comprises displaying feedback indicators that graphically represent satisfaction associated with each of the plurality of portions in the content item to the plurality of reviewers.

7. The method of claim 1, wherein displaying the feedback indicator further includes displaying a reviewer's initials with the feedback indicator.

8. The method of claim 1, wherein the feedback indicator is associated with a date or a time of the feedback.

9. The method of claim 1, wherein the comment user interface is for receiving a comment relating to feedback that indicates the satisfaction associated with each of the plurality of portions in the content item.

10. A system for providing a graphical representation of feedback associated with an electronic content item, comprising:
- a processing unit; and
- a memory that including computer-readable instructions that, when executed by the processing unit, cause the system to:
  - display a content item in a computer-enabled interface;
  - provide access to the content item for a plurality of reviewers via a collaborative environment;
  - display a feedback interface component within the computer-enabled interface, in response to receiving an instruction to launch the feedback interface component;
  - receive, in the feedback interface component, feedback from a reviewer, wherein the feedback indicates a satisfaction associated with a portion of a plurality of portions in the content item; and
  - display a feedback indicator and comment icon in the feedback interface component, wherein the feedback indicator graphically represents the satisfaction associated with a respective, selected portion of the plurality of portions in the content item, the feedback interface component, including the feedback indicator and comment icon, being displayed at a location depending on the respective, selected portion of the plurality of portions that is associated with the feedback;
  - display, in response to selection of the comment icon in the feedback interface component, a comment user interface for receiving a comment relating to the feedback.

11. The system of claim 10, wherein each feedback indicator displays varying levels of satisfaction associated with the plurality of portions in the content item.

12. The system of claim 11, wherein the varying levels of satisfaction are associated with colors to graphically represent the satisfaction associated with each of the plurality of portions in the content item.

13. The system of claim 11, further comprising wherein the varying levels of satisfaction are associated with numeric values to graphically represent the satisfaction associated with each of the plurality of portions in the content item.

14. The system of claim 10, wherein each feedback indicator that displays an image indicating satisfaction or an image indicating dissatisfaction.

15. The system of claim 10, wherein the comment user interface is for receiving a comment relating to feedback that indicates the satisfaction associated with each of the plurality of portions in the content item.

16. The system of claim 10, wherein each feedback indicator display an image indicating satisfaction or an image indicating dissatisfaction.

17. The system of claim 10, wherein display of the feedback indicator is to the plurality of reviewers.

18. The system of claim 10, wherein display of the feedback indicator includes displaying a reviewer's initials with the feedback indicator.

19. The system of claim 10, wherein the feedback indicator is associated with a date or a time of the feedback.

20. A computer readable storage device containing computer executable instructions which when executed by a computer perform a method of providing a graphical representation of feedback associated with an electronic content item, comprising:

displaying a content item in a computer-enabled interface;

providing access to the content item for a plurality of reviewers via a collaborative environment;

displaying a feedback interface component within the computer-enabled interface, in response to receiving an instruction to launch the feedback interface component;

receiving, in the feedback interface component, feedback from a reviewer, wherein the feedback indicates a satisfaction associated with a portion of a plurality of portions in the content item; and displaying a feedback indicator and comment icon in the feedback interface component, wherein the feedback indicator graphically represents the satisfaction associated with a respective, selected portion of the plurality of portions in the content item, the feedback interface component, including the feedback indicator and comment icon being displayed at a location depending on the respective, selected portion of the plurality of portions that is associated with the feedback;

displaying, in response to selection of the comment icon in the feedback interface component, a comment user interface for receiving a comment relating to the feedback.

* * * * *